United States Patent
Sakurai et al.

(10) Patent No.: US 9,065,891 B2
(45) Date of Patent: Jun. 23, 2015

(54) RADIO COMMUNICATION APPARATUS AND CURRENT REDUCING METHOD

(75) Inventors: Masanori Sakurai, Tokyo (JP); Naoki Kobayashi, Tokyo (JP); Noriaki Ando, Tokyo (JP); Hiroshi Toyao, Tokyo (JP); Masaharu Imazato, Tokyo (JP)

(73) Assignee: Lenovo Innovations Limited, Quarry Bay (HK)

( * ) Notice: Subject to any disclaimer, the term of this patent is extended or adjusted under 35 U.S.C. 154(b) by 376 days.

(21) Appl. No.: 13/576,192
(22) PCT Filed: Mar. 25, 2011
(86) PCT No.: PCT/JP2011/001760
§ 371 (c)(1),
(2), (4) Date: Jul. 31, 2012
(87) PCT Pub. No.: WO2011/121956
PCT Pub. Date: Oct. 6, 2011

(65) Prior Publication Data
US 2012/0306705 A1    Dec. 6, 2012

(30) Foreign Application Priority Data

Mar. 31, 2010  (JP) ................................ 2010-081440
Mar. 31, 2010  (JP) ................................ 2010-081473

(51) Int. Cl.
| | |
|---|---|
| H01Q 1/24 | (2006.01) |
| H01Q 19/06 | (2006.01) |
| H01Q 19/10 | (2006.01) |
| H04M 1/02 | (2006.01) |
| H01Q 15/00 | (2006.01) |

(52) U.S. Cl.
CPC ............. *H04M 1/0241* (2013.01); *H01Q 1/243* (2013.01); *H04M 1/0214* (2013.01); *H04M 1/0235* (2013.01); *H01Q 15/0086* (2013.01)

(58) Field of Classification Search
CPC ............ H04M 1/0235; H04M 1/0237; H04M 1/0239; H01Q 15/0086; H01Q 1/243
USPC ........................................................ 361/749
See application file for complete search history.

(56) References Cited

U.S. PATENT DOCUMENTS

| | | |
|---|---|---|
| 5,786,979 A | 7/1998 | Douglass |
| 2007/0243913 A1* | 10/2007 | Collins ..................... 455/575.4 |
| 2008/0048925 A1 | 2/2008 | Soutome et al. |
| 2011/0134010 A1* | 6/2011 | Toyao et al. .................. 343/844 |
| 2011/0170267 A1 | 7/2011 | Ando |

FOREIGN PATENT DOCUMENTS

| | | |
|---|---|---|
| JP | 2005-031856 A | 2/2005 |
| JP | 2007-135148 A | 5/2007 |
| JP | 2008-147763 A | 6/2008 |
| JP | 2009-159234 A | 7/2009 |
| WO | WO-2006/043326 A1 | 4/2006 |
| WO | WO-2010/029770 A1 | 3/2010 |

OTHER PUBLICATIONS

Machine translation of Takahashi JP 2007135148.*
Machine Translation Ando WO 2010029770.*
Chinese Office Action issued for corresponding application CN 201180018010.2, dated Dec. 18, 2013 (with English translation).

* cited by examiner

*Primary Examiner* — Dameon E Levi
*Assistant Examiner* — Ricardo Magallanes

(57) ABSTRACT

A radio communication apparatus includes: a first casing; a second casing; a connection section that connects the first and second casings to each other to be movable; and an antenna device that operates at a predetermined communication frequency. In the radio communication apparatus, first and second states are switched between by relatively moving the first and second casings. The first state is a state in which the first and second casings are opened or closed with respect to one another, and a first conductor (122) installed from the connection section to the first casing and a second conductor (240) installed from the connection section to the second casing are separated and faced each other. In the first state, the first conductor (122) and the second conductor (240) are electrically connected to each other at the communication frequency. The second state is a state in which the first and second casings are closed or opened with respect to one another.

19 Claims, 33 Drawing Sheets

RADIO COMMUNICATION APPARATUS AND CURRENT REDUCING METHOD

TECHNICAL FIELD

The present invention relates to a radio communication apparatus and a current reducing method.

BACKGROUND ART

There are known cellular phones (radio communication apparatuses) that is opened and closed by relatively sliding or rotating their casings. In radio communication terminals, it is important to improve antenna characteristics. For example, Patent Document 1 discloses a case in which antenna characteristics deteriorate when a radio communication terminal approaches a human body, and a technology that prevents the antenna characteristics from deteriorating by providing a first parasitic element longer than the electrical length of an antenna on the front surface side of a casing including a display unit and a second parasitic element shorter than the electrical length of the antenna on the rear surface side of the casing.

In cellular phones whose casings are opened and closed, a problem may arise in that the antenna characteristics of the cellular phones are changed between the opened state and the closed state of the casings. One of the causes of the change in the antenna characteristics of cellular phones is a change in the positional relation of a conductor included in the cellular phones between the opened state and the closed state of the casings. Since cellular phones comprise conductors in a flexible printed circuit (FPC) that is a flexible interconnect substrate interconnecting the casings or in the casings themselves, the positional relation between the casings and that of the folded states of FPC are changed depending on the opened state and the closed state of the casing.

For example, in the case of the FPC that connects the casings each other, the FPC is folded in either the opened or closed state and is extended in a substantially straight shape in the other state. In this case, currents with reverse phases flow in a region in which the FPC is folded and overlaps in a double-sheet shape (hereinafter, referred to as an overlapping region). For this reason, if an overlapping region exists near an antenna device disposed in a casing, each side of the overlapping FPC individually has an influence on the antenna characteristics. Therefore, when the folded state of the FPC is changed by opening or closing the casings, the antenna characteristics change. The change in the antenna characteristics has an adverse effect on communication quality.

On the other hand, Patent Document 2 discloses a technology in which the FPC in the overlapping region is short-circuited by providing a conductor piece fixed to a casing in a block state between the folded FPC and performing capacitance coupling. Thus, an effective length of the facing length between the casing and the FPC is adjusted.

Further, another cause to change the antenna characteristics of a cellular phone is that switching casings between the opened state and closed state changes the positional relation between the conductors such as metal plates of the casings. As will be described in detail later, currents flowing in the casings in the opened state do not interfere with each other. However, since the radio waves radiated from the currents flowing in the casings overlapping with each other in the closed state have reverse phases, the antenna function of a cellular phone deteriorates.

RELATED DOCUMENT

Patent Document

[Patent Document 1] Japanese Laid-open patent publication NO. 2005-31856
[Patent Document 2] Japanese Laid-open patent publication NO. 2009-159234

DISCLOSURE OF THE INVENTION

In the technology disclosed in Patent Document 1, it is difficult to short-circuit the FPC with high reproducibility when the casings are opened and closed in a sliding manner. This is because it is necessary to face the conductor piece at a gap equal to or less than a predetermined gap to the pair of folded FPC in order to perform capacitance coupling from the conductor piece to the FPC. If the gap between the conductor piece and the FPC is small, it may cause a problem in an operation of opening or closing the casings. In contrast, if the gap between the conductor piece and the FPC is large, it is difficult to maintain the desired facing gap between the conductor piece and the folded FPC.

The present invention is devised in light of the above-mentioned circumstances and an object of the present invention is to provide a radio communication apparatus and a current reducing method capable of reducing a change in the antenna characteristics caused by the operations of opening and closing casings without deterioration in the operations of the opening and closing the casings.

In one embodiment, a radio communication apparatus includes: a first casing; a second casing; a connection section that connects the first and second casings to each other to be movable; and an antenna device that operates at a predetermined communication frequency. First and second states are switched between by relatively moving the first and second casings. The first state is a state in which the first and second casings are opened or closed with respect to one another, a first conductor installed from the connection section to the first casing and a second conductor installed from the connection section to the second casing are separated and faced each other, and the first and second conductors are electrically connected to each other at the communication frequency. The second state is a state in which the first and second casings are closed or opened with respect to one another.

In another embodiment, a current reducing method is a method of reducing a current flowing in an overlapping region in a radio communication apparatus which includes a first casing, a second casing, a connection section connecting the first and second casings to be movable, an antenna device operating at a predetermined communication frequency, a first conductor installed from the connection section to the first casing, and a second conductor installed from the connection section to the second casing and in which the overlapping region between the first and second conductors is changed by relatively moving the first and second casings. The current reducing method includes electrically short-circuiting the first and second conductors to each other by making at least one of the first and second conductors resonate at a communication frequency of the radio communication apparatus, when the first and second conductors are separated to face each other.

Each constituent element of the invention does not have to be independent from each other. For example, a plurality of constituent elements may be formed as a single member, a single constituent element may be formed as a plurality of members, a given constituent element may be part of another constituent element, or part of a given constituent element and part of another constituent element may overlap.

According to the radio communication apparatus and the current reducing method of the present invention, the change in the antenna characteristics between the first and second states is suppressed without deterioration in the operations of opening and closing the casings.

BRIEF DESCRIPTION OF THE DRAWINGS

The above-described object, other objects, characteristics, and advantages are apparent in the description of a preferred embodiment and the drawings accompanying the embodiment.

DESCRIPTION OF EMBODIMENTS

Figure 1A:
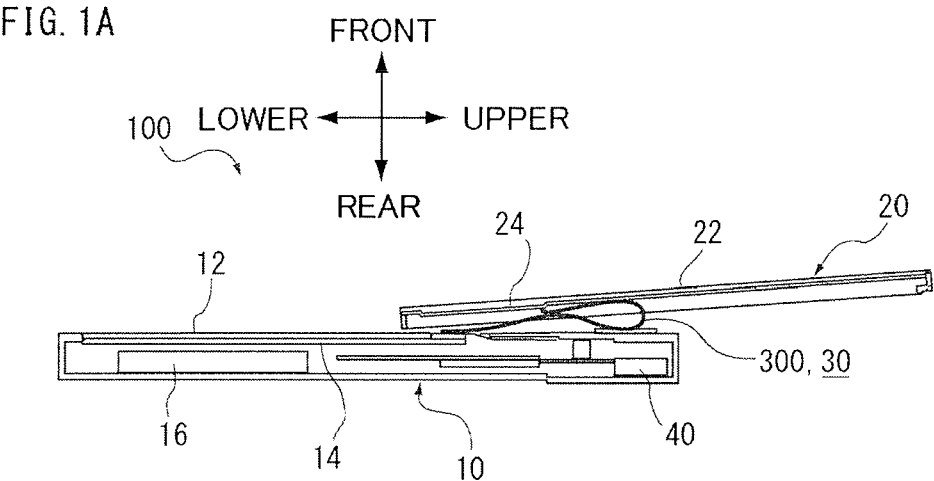
FIG. 1A is a longitudinal sectional view schematically illustrating an opened state of a radio communication apparatus of a first embodiment and FIG. 1B is a longitudinal sectional view schematically illustrating a closed state of the radio communication apparatus of the first embodiment.

Hereinafter, embodiments of the present invention will be described with reference to the drawings. Through the drawings, the same reference numerals are given to the same constituent elements and the description thereof will not be repeated.

First Embodiment

Figure 1B:
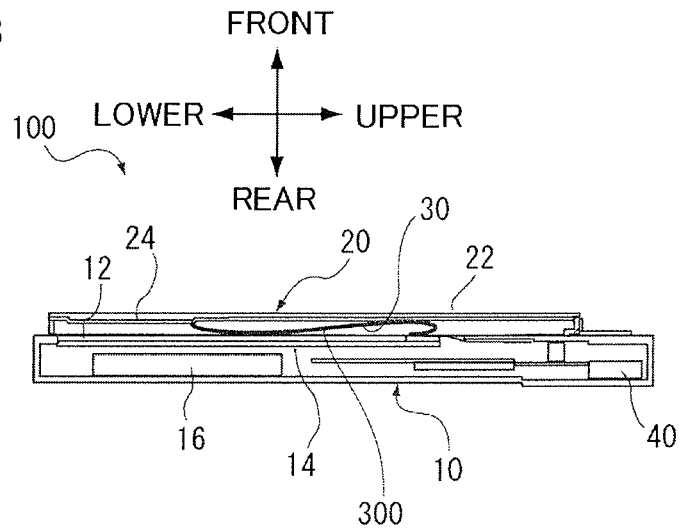
Figure 2A:
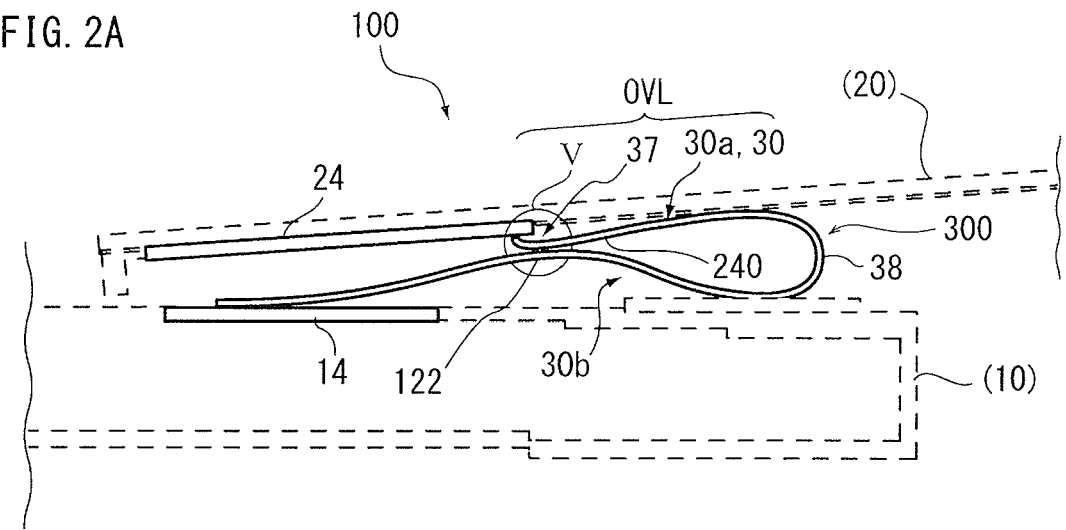
FIG. 2A is a partial schematic view illustrating a first circuit substrate, a second circuit substrate, and an interconnect substrate in the opened state
Figure 2B:
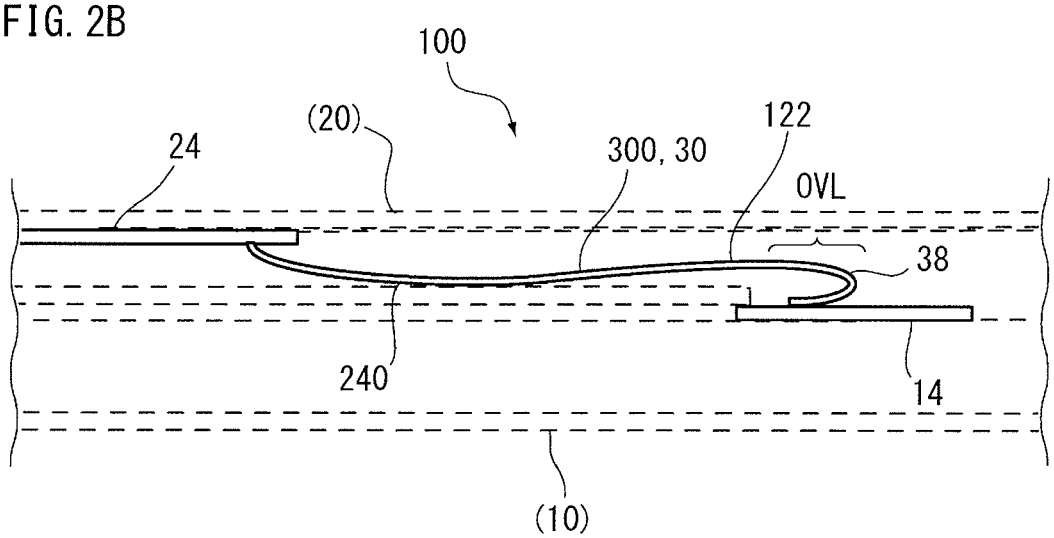
FIG. 2B is a partial schematic view illustrating the first circuit substrate, the second circuit substrate, and the interconnect substrate in the closed state.

FIGS. 1A and 1B are longitudinal sectional views schematically illustrating a radio communication apparatus 100 of the embodiments of the present invention. FIG. 2A is a partial schematic view illustrating a first circuit substrate 14, a second circuit substrate 24, and an interconnect substrate 30 in an opened state of FIG. 1A. Likewise, FIG. 2B is a partial schematic view illustrating the first circuit substrate 14, the second circuit state 24, and the interconnect substrate 30 in a closed state of FIG. 1B. In FIGS. 2A and 2B, the first casing 10 and the second casing 20 are indicated by dashed lines and a part of their constituent elements are not illustrated for description.

First, the overview of the radio communication apparatus 100 will be described.

The radio communication apparatus 100 of this embodiment includes the first casing 10, the second casing 20, a connection section 300 that connects the first casing 10 to the second casing 20 to be movable, and an antenna device 40 that operates at a predetermined communication frequency. The radio communication apparatus 100 can be switched between a first state (FIG. 1A) and a second state (FIG. 1B) described below by relatively moving the first casing 10 and the second casing 20.

The first state shown in FIGS. 1A and 2A is a state in which the first casing 10 and the second casing 20 are opened or closed (in this embodiment, opened) with respect to one another, and a first conductor 122 installed from the connection section 300 to the first casing 10 faces a second conductor 240 installed from the connection section 300 to the second casing 20 so as to be separated from each other. In the first state, the first conductor 122 and the second conductor 240 are electrically connected to each other at a communication frequency.

On the other hand, the second state shown in FIGS. 1B and 2B is a state in which the first casing 10 and the second casing 20 are closed or opened (in this embodiment, closed).

The connection section 300 is a region that is located between the first casing 10 and the second casing 20 and includes a flexible substrate and a hinge that connect these casings to each other. The first casing 10 and the second casing 20 are connected through the connection section 300 to be slidable or rotatable with respect to one another.

The first conductor 122 is a conductor that is installed from the connection section 300 to the first casing 10. Here, the fact that the first conductor 122 is installed from the connection section 300 to the first casing 10 means that conductive members are disposed between an intermediate portion (for example, a half folded portion 38) of the connection section 300 and the first casing 10, or in a region with a predetermined area inside the first casing 10. Likewise, the fact that the second conductor 240 is installed from the connection section 300 to the second casing 20 means that conductive members are disposed between an intermediate portion (for example, the half folded portion 38) of the connection section 300 and the second casing 20, or in a region with a predetermined area inside the second casing 20.

In first to fourth embodiments, regions different from each other in the flexible substrate are referred to as first and second conductors. In fifth to seventh embodiments, the first and second casing themselves and a rigid circuit substrate buried in each casing are referred to as first or second conductor. Hereinafter, description will be made more specifically.

The radio communication apparatus 100 of the first embodiment includes the first casing 10, the second casing 20, and a flexible interconnect substrate 30. The second casing 20 is slid relative to the first casing 10. The interconnect substrate 30 includes conductor components 36 connected to a conductor layer 34, conductor layers 34, and interconnect layers 32 (see FIG. 4), and connects the first casing 10 to the second casing 20.

The radio communication apparatus 100 can be switched between the first and second states by sliding the first casing 10 and the second casing 20 relative to each other.

In the first state, the interconnect substrate 30 is turned over so that the conductor components 36 in one region face the conductor layer 34 in another region (see FIG. 5). The interconnect substrate 30 is extended further in the second state than in the first state.

Hereinafter, this embodiment will be described in detail.

The radio communication apparatus 100 is, for example, a slide open/close cellular phone.

The first casing 10 is an operation-side casing that a user holds in his or her hand. The first casing 10 includes an operation keyboard 12, a first circuit substrate 14, a power source 16, and the antenna device 40. The operation keyboard 12, the power source 16, and the antenna device 40 are electrically connected to the first circuit substrate 14. The operation keyboard 12 is an input interface on which the user performs an input operation with his or her finger or the like. The first circuit substrate 14 controls the radio communication apparatus 100. The antenna device 40 transmits and receives a radio wave of a predetermined communication frequency. The power source 16 supplies power to the radio communication apparatus 100.

The second casing 20 is a display-side casing that includes a display panel 22 and a second circuit substrate 24.

The second circuit substrate 24 receives a signal from the first circuit substrate 14 through the interconnect substrate 30 and controls the display panel 22. The display panel 22 is a display that displays various kinds of outputs.

Between the first circuit substrate 14 and the second circuit substrate 24, signals at various operation frequencies of the radio communication apparatus 100 are transmitted through the interconnect substrate 30. The radio communication apparatus 100 may have a plurality of operation frequencies. Examples of the operation frequency include a clock frequency of a device mounted on the first circuit substrate 14 or the second circuit substrate 24, and a communication frequency of the antenna device 40.

Examples of the communication frequency of the antenna device 40 include not only a call or communication frequency band of a cellular phone or a radio communication system, but also a frequency band of a positioning system or a digital television. Specifically, examples of the communication frequency include not only an 800 MHz band, a 1.5 GHz band, and a 2 GHz band utilized for a mobile communication system and but also a 2.4 GHz band and a 5 GHz band utilized for a wireless local area network (LAN).

The interconnect substrate 30 is a so-called flexible substrate (FPC). The configuration of the interconnect substrate 30 will be described in detail later with reference to FIG. 4.

In this embodiment, as shown in FIGS. 1A and 1B, the upper and lower directions of a sheet surface corresponding to surface-normal directions of the operation keyboard 12 of the first casing 10 are defined as front and rear directions, and the right and left directions of the sheet surface corresponding to the longitudinal direction of the radio communication apparatus 100 are defined as upper and lower directions. The defined directions are used for facilitating the description of the relative relation of constituent elements, and do not limit the directions used when manufacturing or operating the radio communication apparatus 100.

The first casing 10 and the second casing 20 are slid relative to each other by sliding mechanisms (not shown) extending in the upper and lower directions to be opened and closed. Hereinafter, the first casing 10 is assumed to be a fixed side and the second casing 20 is assumed to be a slidable side for facilitating the description. However, it is not necessary to fix one of these casings with respect to a user or a space. These casings may be slid in an opposite direction with respect to one another.

FIG. 1A is a diagram illustrating an opened state in which the second casing 20 is slid upward and the operation keyboard 12 is then exposed. FIG. 1B is a diagram illustrating a closed state in which the second casing 20 is slid downward and the operation keyboard 12 is then covered.

The surface-normal direction of the display panel 22 of the second casing 20 in the opened state is slightly inclined with respect to the front and rear directions of the radio communication apparatus 100. That is, the second casing 20 is switched between the opened state and the closed state by slid in the upper and lower directions and slightly rotated in a width direction (the front and rear directions of the sheet surface in FIGS. 1A and 1B). In this embodiment, the sliding of the second casing 20 includes translation movement of the second casing 20 with respect to the first casing 10 in a straight manner or a curved manner and rotation movement of the second casing 20 with respect to the first casing 10. Instead, the second casing 20 may be slid in a straight manner without inclination of the second casing 20 with respect to the first casing 10 in a state in which the surface-normal directions of these casings coincide with each other.

The interconnect substrate 30 shown in FIG. 2A is entirely folded. This state corresponds to the first state. Connectors (not shown) are installed at both ends of the first circuit substrate 14, the second circuit substrate 24, and the interconnect substrate 30 to be fitted to each other. The end portions of the interconnect substrate 30 are fixed to the first circuit substrate 14 and the second circuit substrate 24 in any direction.

An overlapping region OVL, a region in which the folded interconnect substrate 30 overlaps, is accommodated in the second casing 20. Because of the restriction of a space for accommodating the overlapping region OVL due to the dimensional constraints of the second casing 20 and the property of the interconnect substrate 30 that maintains its predetermined shape due to bending rigidity, the interconnect substrate 30 and the second casing 20 come into close contact with each other, and each side of the folded interconnect substrate 30 comes into close contact with each other. Therefore, in the interconnect substrate 30, as shown in FIG. 2A, a neck portion 37 that has a small facing gap of the interconnect substrate 30 is formed. The half folded portion 38 of the folded interconnect substrate 30 is formed in an arc shape, so that the entire interconnect substrate 30 is formed in a substantial Ω shape. The shape of the interconnect substrate 30 in the first state has high reproducibility. Therefore, whenever the second casing 20 is slid so that the radio communication apparatus 100 enters the opened state, the predetermined facing gap (surface-normal distance) of the interconnect substrate 30 in the neck portion 37 is reproduced.

The overlapping region OVL of the interconnect substrate 30 refers to a region at which the folded interconnect substrate 30 overlaps with itself in the shape of a plurality of sheets, when the interconnect substrate 30 is seen from the surface-normal direction of at least one of the first casing 10 and the second casing 20.

The neck portion 37 refers to a region at which the facing gap of the interconnect substrate 30 is minimum inside the overlapping region OVL in the first state except for the vicinity of the half-folded portion 38. The neck portion 37 is a region that has a predetermined gap. Further, in the neck portion 37, each side of the folded interconnect substrate 30 may come into contact with each other (the facing gap=0) or may be separated from each other (the facing gap is not equal to zero).

In the interconnect substrate 30, a length section corresponding to the front surface side of the overlapping region OVL is referred to as a front surface section 30a and a length section corresponding to the rear surface side of the overlapping region OVL is referred to as a rear surface section 30b. A conductor included in the front surface section 30a corresponds to the second conductor 240 and a conductor included in the rear surface section 30b corresponds to the first conductor 122.

A current flowing in the interconnect substrate 30 from the first casing 10 to the second casing 20 (and vice versa) is a reverse-phase current in an opposite direction between the front surface section 30a and the rear surface section 30b.

On the other hand, when the second casing 20 is switched from the opened state (FIG. 1A) to the closed state (FIG. 1B), the interconnect substrate 30 is drawn downward together with the second casing 20 to be entirely extended (see FIG. 2B). This state corresponds to the second state. The area of the overlapping region OVL of the folded interconnect substrate 30 in the first state is greater than the area of that in the second state. In this embodiment, the neck portion 37 of the interconnect substrate 30 in the second state is not present.

Here, as shown in FIG. 1A, the antenna device 40 is disposed at a position facing the overlapping region OVL in the first state.

In this embodiment, the fact that the antenna device 40 faces the overlapping region OVL means that at least part of the antenna device 40 is located on the inside of the overlapping region OVL when the antenna device 40 is seen from the surface-normal direction of the casing (in this embodiment, the second casing 20) that accommodates the overlapping region OVL.

The radio communication apparatus 100 of this embodiment has a metamaterial structure in which the reverse-phase current flowing in the overlapping region OVL in the first state is short-circuited inside the interconnect substrate 30 to suppress the influence on the antenna characteristics of the antenna device 40. Hereinafter, the interconnect substrate 30 of this embodiment will be described.

Figure 3:
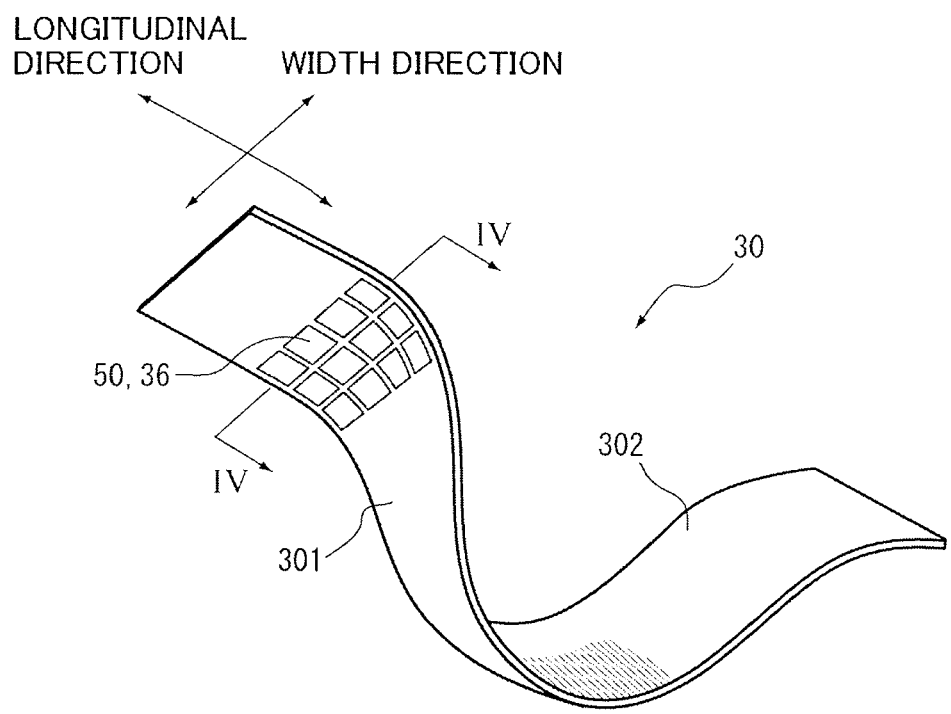
FIG. 3 is a perspective view schematically illustrating the interconnect substrate of the first embodiment.
Figure 4:
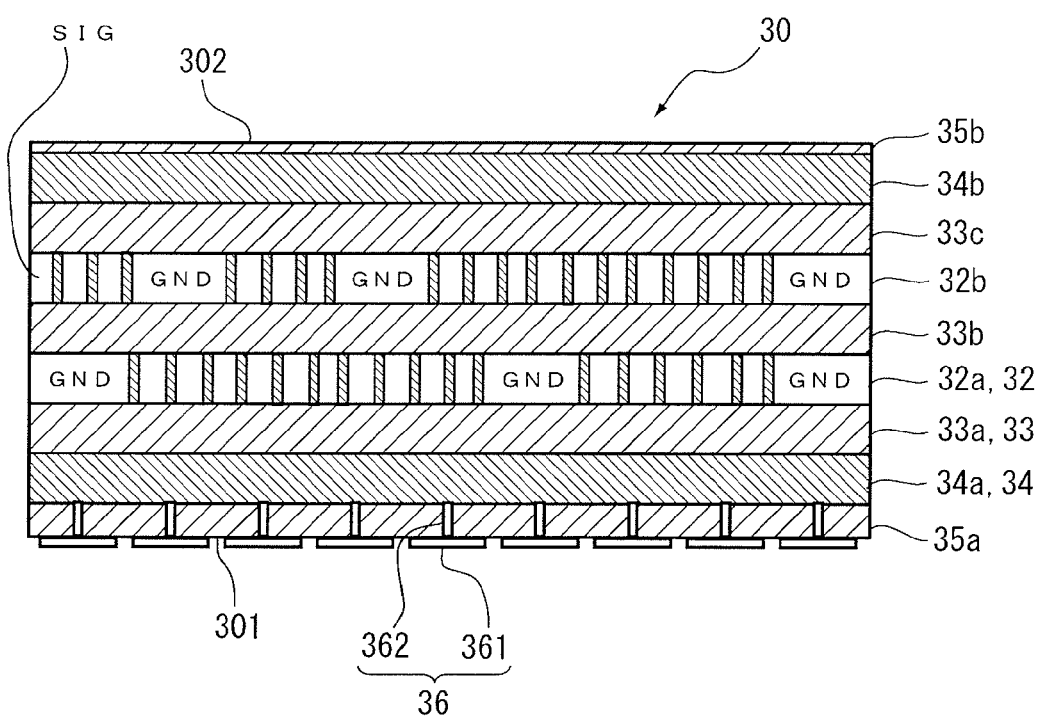
FIG. 4 is a sectional view taken along line IV-IV of FIG. 3.

FIG. 3 is a perspective view schematically illustrating the interconnect substrate 30 of this embodiment. FIG. 4 is a sectional view taken along the line IV-IV of FIG. 3. The interconnect substrate 30 includes not only interconnect layers 32 and the conductor layers 34 but also the conductor components 36 on at least one of the main surfaces thereof. One side of the main surface on which the conductor components 36 are installed is referred to as a front surface 301 and the other side of the main surface is referred to as a rear surface 302. Although four conductor components 36 are illustrated in the width direction and three conductor components 36 are illustrated in the longitudinal direction in FIG. 3, the number, sizes, and positions of the conductor components 36 are merely examples. Only the single conductor component 36 may be provided.

The interconnect layer 32 shown in FIG. 4 is a layer in which multiple signal lines SIG through which a signal of the operation frequency is transmitted and received between the first circuit substrate 14 and the second circuit substrate 24 (see FIG. 1), grounds GND given a constant potential such as a ground potential, and power interconnects (not shown) are formed in a pattern. The signal lines SIG are insulated from each other and the signals SIG and the grounds GND are insulated from each other. The interconnect layer 32 may be formed by chemical etching of copper coating and so on. The interconnect substrate 30 includes one interconnect layer 32 or two or more interconnect layers 32. In FIG. 4, the interconnect substrate 30 including two interconnect layers 32a and 32b is exemplified.

The conductor layers 34 (34a and 34b) are shield layers made of a metal material such as copper and laminated on both of the upper and lower sides of the interconnect layer 32. One of the conductor layers 34a and 34b is grounded and both the conductors 34a and 34b are electrically connected to each other by a via (not shown). The conductor layers 34 are each formed on the substantially entire surface of the interconnect substrate 30, but regions at which no conductor layer is formed may be allowed to be present locally.

Insulation layers 33 (33a, 33b, and 33c) are laminated between the conductor layers 34 and the interconnect layers 32 and between the interconnect layers 32, respectively. The insulation layers 33 may be formed by coating an insulation resin material. Insulation coat layers 35a and 35b are further laminated on the outside of the conductor layer 34, respectively.

The conductor components 36 are formed in the same layer as the conductor layer 34 and are laminated directly or indirectly on the front surface 301 of the conductor layer 34. In this embodiment, a so-called mushroom-shaped conductor component 36 including a facing portion 361 formed in a planar shape along the conductor layer 34 and a connection portion 362 extending in the surface-normal direction of the interconnect substrate 30 and connecting the conductor component 361 to the conductor layer 34a is exemplified. As will be described later, various shapes of the conductor component 36 may be used. The connection portion 362 is a columnar via formed through the coat layer 35a.

When the facing portion 361 is exposed from the coat layer 35a, it is preferable that an insulation coat layer (not shown) coating the facing portion 361 is formed on the front surface 301 of the interconnect substrate 30. Hereinafter, for facilitating the description, the thickness of this coat layer is assumed to be included in the thickness of the coat layer 35a.

Figure 5A:
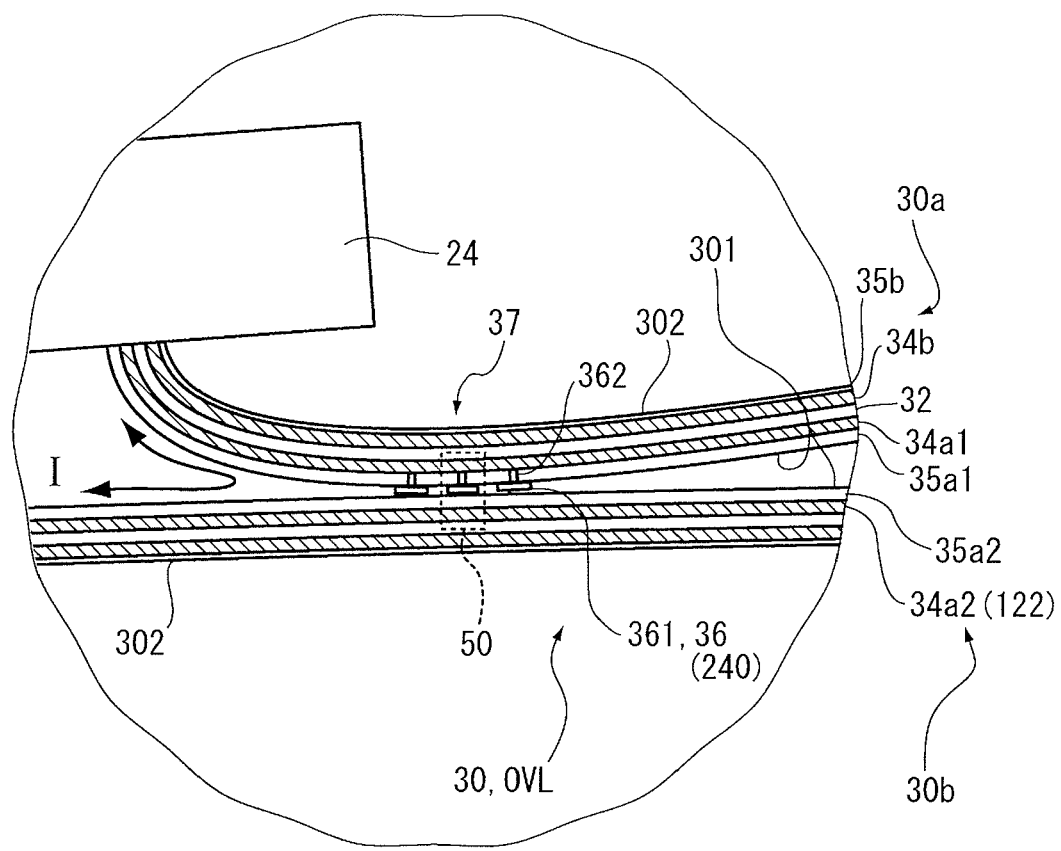
FIG. 5A is an expanded view illustrating the neighborhood region of a neck portion and FIG. 5B is a diagram Illustrating an equivalent circuit of a unit cell of a metamaterial.

FIG. 5A is an expanded view illustrating the neighborhood region of the neck portion 37 marked with a circle V in FIG. 2A in the first state of the interconnect substrate 30. In the first state, the interconnect substrate 30 is folded so that the front surface 301 is folded toward the inside.

In the interconnect substrate 30 of which one end is connected to the second circuit substrate 24, the front surface section 30a and the rear surface section 30b overlap with each other in the overlapping region OVL including the neck portion 37. In the first state, the interconnect substrate 30 is folded, and thus the conductor components 36 of one region (the front surface section 30a) face the conductor layer 34 of another region (the rear surface section 30b).

The interconnect substrate 30 in the first state is formed in a substantial Q shape (see FIG. 2A), and one or a plurality of conductor components 36 are formed in the neck portion 37 corresponding to a narrow portion of the above mentioned substantial Q shape.

The facing portion 361 of the conductor component 36 installed in the neck portion 37 is interposed between the conductor layer 34a on the side of the front surface 301 of the front surface section 30a (hereinafter, referred to as a conductor layer 34a1) and the conductor layer 34a on the side of the front surface 301 of the rear surface section 30b (hereinafter, referred to as a conductor layer 34a2).

That is, the conductor layers 34a1 and the 34a2 refer to different regions in the same conductor layers 34a.

The thickness of the coat layer 35a on the side of the front surface 301 of the front surface section 30a (hereinafter, referred to as a coat layer 35a1) corresponds to the distance between the conductor layer 34a1 and the facing portion 361. Further, the thickness of the coat layer 35a on the side of the front surface 301 of the rear surface section 30b (hereinafter, referred to as a coat layer 35a2) corresponds to the distance between the conductor layer 34a2 and the facing portion 361.

At least one (in this embodiment, the conductor component 36) of the second conductor 240 (in this embodiment, the conductor component 36 and the conductor layer 34a1) and the first conductor 122 (in this embodiment, the conductor layer 34a2) facing each other in the first state resonates at the communication frequency of the radio communication apparatus 100 to form a metamaterial. This metamaterial electrically connects the conductor components 36 to the conductor layers 34a1 and 34a2 at the communication frequency of the radio communication apparatus 100.

The conductor components 36 and the conductor layers 34 of this embodiment form an electromagnetic band-gap (EBG) structure of a so-called right-handed system. Here, a right-handed metamaterial refers to an artificial substance that has a positive dielectric constant, positive magnetic permeability, and a positive refractive index. On the other hand, a left-handed metamaterial refers to an artificial substance that has a negative dielectric constant, negative magnetic permeability, and a negative refractive index.

A unit cell 50 having such a kind of EBG structure includes a pair of conductor planes parallel to each other and the conductor component 36 electrically connected to one of the above conductor planes. In this embodiment, the EBG structure is a so-called mushroom-shaped EBG structure. The unit cell 50 having the mushroom-shaped EBG structure includes the facing portion 361, either the conductor layers 34a1 or 34a2 that faces the facing portion 361, and any auxiliary connection portion (not shown). Specifically, the facing portion 361, which is a conductive member having a planar shape in the conductor component 36, corresponds to a head portion of the mushroom. The connection portion 362 having a columnar shape or a line shape which has an area smaller than the facing portion 361 in a plan view corresponds to an inductance portion of the mushroom. Further, the conductor layer 34a2 corresponds to a conductor frame on the upper side and the conductor layer 34a1 corresponds to a conductor frame on the lower side. That is, in the radio communication apparatus 100 of this embodiment, the conductor layers 34a1 and 34a2 that are formed by folding the conductor layer 34a are used as a pair of conductor planes in the EBG structure. Further, to switch the interconnect substrate 30 between the first and second states, the conductor component 36 is physically connected to only one of the conductor layers and is relatively displaceable with the other of the conductor layers.

Figure 5B:
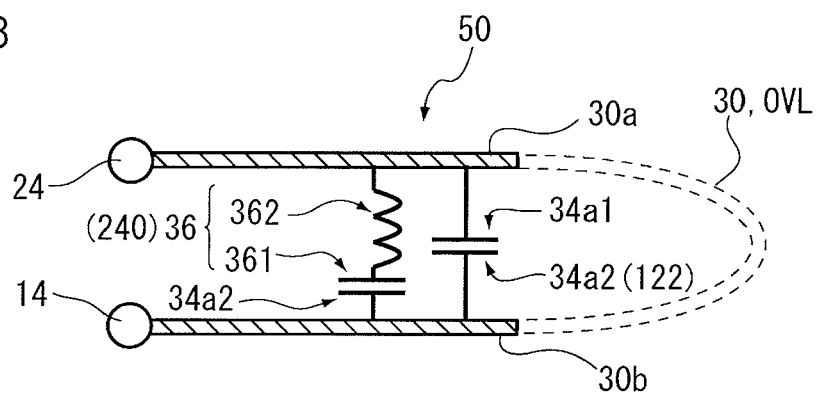

The advantages of the radio communication apparatus 100 of this embodiment will be described with reference to FIG. 5B. FIG. 5B is a diagram illustrating an equivalent circuit of the unit cell 50 of the metamaterial. The unit cell 50 of this embodiment is a so-called mushroom-shaped unit cell. Specifically, as shown in the drawing, the connection portion 362 functions as an inductance element of the unit cell 50. The conductor layer 34a1 and the facing portion 361 function as a first capacitance of the unit cell 50. The conductor layers 34a1 and 34a2 function as a second capacitance of the unit cell 50. Although not illustrated in the drawing, the facing portions 361 adjacent to each other form a third capacitance.

The conductor component 36 resonates at the communication frequency of the radio communication apparatus 100. Thus, even when the electromagnetic wave of the communication frequency transmitted and received by the antenna device 40 interferes with the conductor layers 34 of the interconnect substrate 30 and causes a reverse-phase current I, the reverse-phase current I is short-circuited by the conductor components 36 between the conductor layers 34a1 and 34a2.

Therefore, from the point of view of the antenna device 40, the conductor layers 34a1 and 34a2 can be considered as one sheet of conductor, the adverse effect of these conductor layers on the antenna device 40 is therefore reduced to a negligible degree. The fact that the conductor component 36 resonates means that at least a part of the conductor component 36 resonates.

That is, according to this embodiment, the radio communication apparatus 100 provides a current reducing method described below. The current reducing method is a method of reducing the current flowing in the overlapping region in the radio communication apparatus 100. As described above, the radio communication apparatus 100 includes the first casing 10, the second casing 20, the connection section 300 (half folded portion 38 of the interconnect substrate 30) connecting the first casing 10 to the second casing 20 to be movable, the antenna device 40 operating at a predetermined communication frequency, the first conductor 122 (the conductor layer 34a2) installed from the connection section 300 (the half folded portion 38) to the first casing 10, and the second conductor (the conductor components 36 and the conductor layer 34a1) installed from the connection section 300 (the half folded portion 38) to the second casing 20. The overlapping region between the first conductor 122 and the second conductor 240 is changed when the first casing 10 and the second casing 20 are moved relatively.

According to the current reducing method, the first conductor 122 and the second conductor 240 are electrically short-circuited to each other by making at least one of the first conductor 122 and the second conductor 240 resonate at the communication frequency of the radio communication apparatus 100 when the first conductor 122 and the second conductor 240 are separated from each other and face each other.

More specifically, the current reducing method of this embodiment is a method reducing the current flowing in the overlapping region OVL in the radio communication apparatus 100 that includes the first casing 10, the second casing 20 that slides with respect to the first casing 10, and the flexible and folded interconnect substrate 30 including the interconnect layers 32, the conductor layers 34, and the conductor components 36 electrically connected to the conductor layers 34, and connecting the first casing 10 to the second casing 20. The overlapping region OVL in the folded interconnect substrate 30 is changed when the first casing 10 and the second casing 20 slide with respect to each other.

According to the current reducing method, the conductor components 36 are electrically short-circuited to the conductor layers 34a1 and 34a2 by making the conductor components 36 resonate at the communication frequency of the radio communication apparatus 100 with the conductor layer 34a2 of one side of the interconnect substrate (the rear surface section 30b) faced to the conductor components 36 of the other side of the interconnect substrate (the front surface section 30a) in the overlapping region OVL.

According to this embodiment, the pair of conductor layers 34a1 and 34a2 facing each other in the folded flexible interconnect substrate 30 is short-circuited through the conductor components 36 electrically connected to either the conductor layers 34a1 or 34a2. In this case, since the conductor components 36 are connected in advance to the conductor layer 34a1 and form the interconnect substrate 30, the short-circuit between the conductor layers 34a1 and 34a2 is easily implemented merely by adjusting the facing gap of the folded interconnect substrate 30.

According to the current reducing method, a part of the overlapping region OVL (the neck portion 37 of the front surface section 30a) and another part of the overlapping region OVL (the neck portion 37 of the rear surface section 30b) are short-circuited to each other by making the conductor components 36 resonate at the communication frequency of the radio communication apparatus 100, with the conductor components 36, which are disposed in the same layer as the conductor layer 34a1 or laminated on the inner side with respect to the conductor layer 34a in the part of the overlapping region OVL (the neck portion 37 of the front surface section 30a), facing the conductor layer 34a2 in another part of the overlapping region OVL (the neck portion 37 of the rear surface section 30b).

In the first state, as shown in FIG. 1A, the first circuit substrate 14 and the second circuit substrate 24 are located opposite to the antenna device 40 with the neck portion 37 centered therebetween. Therefore, as shown in FIG. 5A, the reverse-phase current I flowing through the conductor layer 34a between the first circuit substrate 14 and the second circuit substrate 24 does not actually flow on the side of the antenna device 40 from the neck portion (the right side of FIG. 5A).

As described above, the conductor layers 34a and 34b are connected to each other through a via (not shown). Therefore, the reverse-phase current flowing in the conductor layer 34b is also short-circuited between the front surface section 30a and the rear surface section 30b through the conductor components 36. The via connecting the conductor layers 34a and 34b may be formed between the neck portion 37 and the second circuit substrate 24 and between the neck portion 37 and the first circuit substrate 14 so that this revere-phase current does not flow into the antenna device 40 from the neck portion 37.

The advantages obtained by short-circuiting the overlapping region OVL can be obtained even when only one unit cell 50 of the metamaterial is present. As shown in FIG. 3, however, the advantages can be obtained more reliably when the plurality of unit cells 50 are arranged in a repetitive manner. In FIG. 3, the unit cells 50 (the conductor components 36) are arranged in the repetitive manner in both of the width direction and the longitudinal direction of the interconnect substrate 30. Although the arrangement pattern of the unit cells 50 is not particularly limited, it is preferable that, for example, the unit cells 50 are arranged at a regular interval.

Here, when the unit cells 50 are arranged in the "repetitive" manner, the gap (the center-to-center distance) of the connection portions 362 in the adjacent unit cells 50 is preferably less than half of the wavelength of the electromagnetic wave of a communication frequency (or one of a plurality of communication frequencies). The "repetitive" arrangement also includes a case in which some of the unit cells 50 lack a part of their constituent elements. When the unit cells 50 are arranged two-dimensionally as in this embodiment, the "repetitive" arrangement also includes a case in which the unit cells 50 may be partially lacked. Further, the "periodic" arrangement also includes a case in which a part of the constituent elements of some unit cells 50 are out of alignment and a case in which some unit cells 50 themselves are out of alignment. That is, even if the periodicity is not realized in a strict sense, the characteristics of the metamaterial can be obtained with the unit cells 50 arranged in the repetitive manner. Therefore, the "periodicity" is allowed to be defective to some extent.

The cause of such defect includes a cause from a manufacturing that forms an interconnect, a via, or the connection portion 362 between the unit cells 50. In addition, for example, when adding a metamaterial structure to the existing interconnect layout or the connections structure between substrates, the following cases may be considered: it is difficult to arrange the unit cells due to the existing via, pattern or the connection portion; there is a manufacturing error, and the existing via, pattern or the connection portion are used as part of the unit cell.

Although FIG. 5A describes the case in which the front surface section 30a comes into close contact with the rear surface section 30b through the facing portion 361 in the interconnect substrate 30 in the first state, the present invention is not limited thereto. In the first state in which the interconnect substrate 30 is folded, the front surface section 30a may be separated from the rear surface section 30b by a predetermined facing gap. As described above, the shape of the overlapping region OVL of the interconnect substrate 30 accommodated inside the radio communication apparatus 100 has high reproducibility. Therefore, in regard to the facing gap between the front surface section 30a and the rear surface section 30b, the reproducibility of the facing gap between the front surface section 30a and the rear surface section 30b may be equivalent to that realized by the first and second capacitances in the equivalent circuit shown in FIG. 5B.

This embodiment may be modified in various ways. Although the case in which the facing portion 361 connected to the conductor layer 34a faces a different region of the same conductor layer 34a is described in the above-described embodiment, the present invention is not limited thereto. In the first state of the radio communication apparatus 100, the facing portion 361 may face a conductor layer other than the conductor layer 34a. For example, it is considered that the conductor layer 34a is notched in a partial region of the interconnect substrate 30, and the conductor layer 34b or another conductor layer (both of which are assumed to be electrically connected to the conductor layer 34a) is exposed on the side of the front surface 301. In this case, in the radio communication apparatus 100 in the first state, the facing portions 361 may face the conductor layer in the partial region and a right-handed metamaterial may be configured. Accordingly, in the radio communication apparatus 100 of this embodiment, the fact that the conductor components 36 in one region face the conductor layer 34 in the other region does not have to mean that the conductor components 36 face the conductor layers 34 connected with the conductor components 36.

In the radio communication apparatus 100 of this embodiment, a right-handed metamaterial structure is established in the first state of the interconnect substrate 30, and is not established in the second state of that. In this embodiment, although the case in which the conductor components 36 in the first state are located in the neck portion 37 and the conductor components 36 are excluded from the neck portion 37 when switching to the second state is described, the present invention is not limited thereto. That is, the conductor components 36 may be located in the neck portion 37 in both the first and second states and the overlapping region OVL may be short-circuited.

(Conductor Component)

The conductor component 36 of this embodiment will be described in more detail.

The conductor component 36 shown in FIG. 5 of this embodiment has a so-called mushroom shape. The conductor component 36 includes the facing portion 361 that has a planar plate and laminated on the side of the front surface 301 further from the conductor layer 34a1, and the columnar connection portion 362 that is erected from the facing portion 361 and is connected to the conductor layer 34a1. Hereinafter, the facing portion 361 having the planar plate is also referred to as a patch and the EBG structure is also referred to as a patch type structure.

In the EBG structure of this embodiment, the facing portion 361 other than the patch type may be set as a microstrip line that is a line-shaped transmission line. Specifically, an open stub structure is set such that one end of the microstrip line (the facing portion 361) is connected to the conductor layer 34a1 and the other end of the microstrip line is an open end. Hereinafter, the EBG structure is also referred to as an open stub type structure.

In both the patch type structure and the open stub type structure, the facing portion 361 may be formed in an island shape in the same layer as the conductor layer 34a1. Alternatively, the facing portion 361 may be formed in a layer different from the conductor layer 34a1, as in the above-described embodiment. Further, a line-shaped element enhancing inductance may be added to the facing portion 361 or the connection portion 362.

The above mentioned EBG structures will be described in modified examples of this embodiment. For facilitating the description, in FIGS. 6 to 9, the conductor layer 34a2 and the rear surface section 30b are illustrated on the upper side and the conductor layer 34a1 and the front surface section 30a are illustrated on the lower side by reversing the upper and lower sides of FIG. 5B.

The EBG structures of this embodiment have a common feature in which a pair of conductor planes (the conductor layers 34a1 and 34a2) facing each other and the facing portion 361 are provided and the facing portion 361 is configured to be separated from one conductor plane (the conductor layer 34a2). Thus, in the EBG structures of this embodiment, a layer inside the unit cell 50 is able to slide along another layer.

Figure 6A:
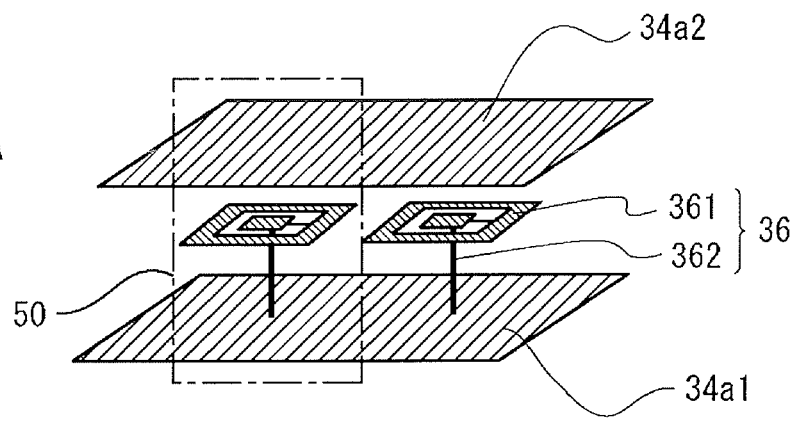
FIG. 6A is a perspective view illustrating a unit cell of a first modified example.
Figure 6B:
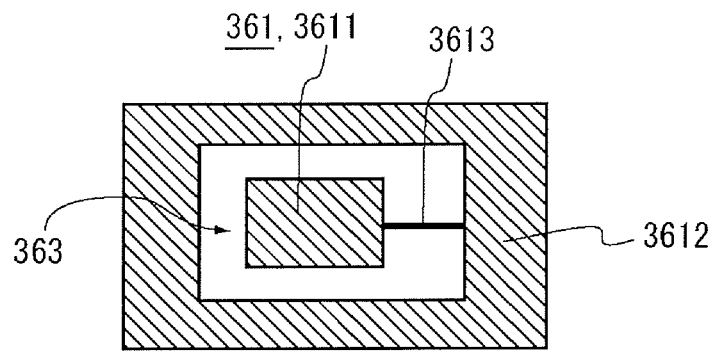
FIG. 6B is a plan view illustrating a facing portion.

FIG. 6A is a perspective view illustrating a unit cell 50 of a first modified example. FIG. 6B is a plan view illustrating a facing portion 361 shown in FIG. 6A. A conductor component 36 of the unit cell 50 of this modified example is different from the conductor component 36 of this embodiment (see FIG. 5) in that the facing unit 361 includes a first conductor piece 3611 and a second conductor piece 3612 separated from each other. The conductor component 36 of this modified example has a patch in which the first conductor piece 3611 and the second conductor piece 3612 are formed in the same layer. The rectangular first conductor piece 3611 is formed in an island shape inside an opening part 363 of the second conductor piece 3612 formed in a rectangular frame shape. The first conductor piece 3611 and the second conductor piece 3612 are connected to each other by an interconnect 3613 formed in the same layer of the first conductor piece 3611 and the second conductor piece 3612. The width size of the interconnect 3613 (the vertical size in FIG. 6B) is less than that of the first conductor piece 3611. The connection portion 362 is connected to the first conductor piece 3611.

Figure 6C:
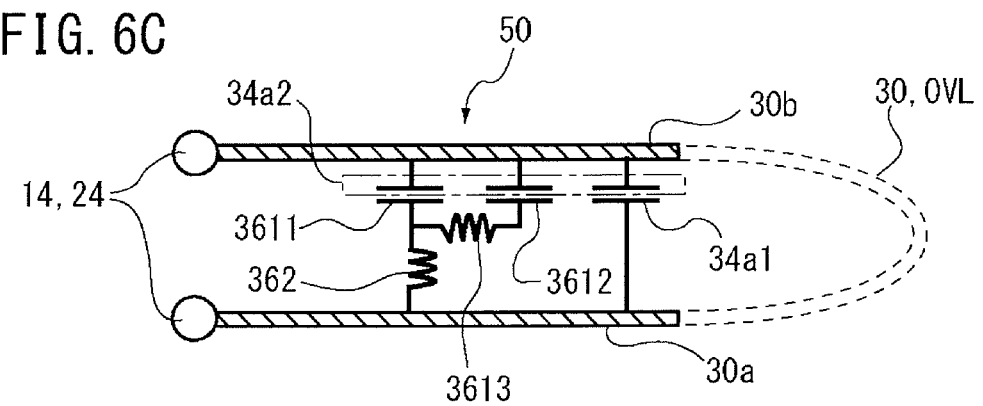
FIG. 6C is a diagram illustrating an equivalent circuit of the unit cell.

FIG. 6C is a diagram illustrating an equivalent circuit of the unit cell 50 shown in FIG. 6A. As in the example shown in FIG. 5, the connection portion 362 functions as a first inductance element of the unit cell 50. The first conductor piece 3611 and the conductor layer 34a2 function as a first capacitance of the unit cell 50. The conductor layers 34a1 and 34a2 function as a second capacitance of the unit cell 50. When the unit cells 50 are adjacent to each other, as shown in FIG. 6A, a third capacitance (not shown in FIG. 6C) is formed between the facing portions 361 that face each other. Further, the second conductor piece 3612 and the conductor layer 34a2 function as a fourth capacitance of the unit cell 50.

The interconnect 3613 functions as a second inductance element. The inductance element is connected in series to the fourth capacitance. The second inductance element and the fourth capacitance are connected in parallel to the first capacitance (the first conductor piece 3611).

According to this modified example, the adjustment range of the characteristics of the metamaterial is broadened, since the inductance elements and capacitances of the unit cell 50 are increased.

Figure 7A:
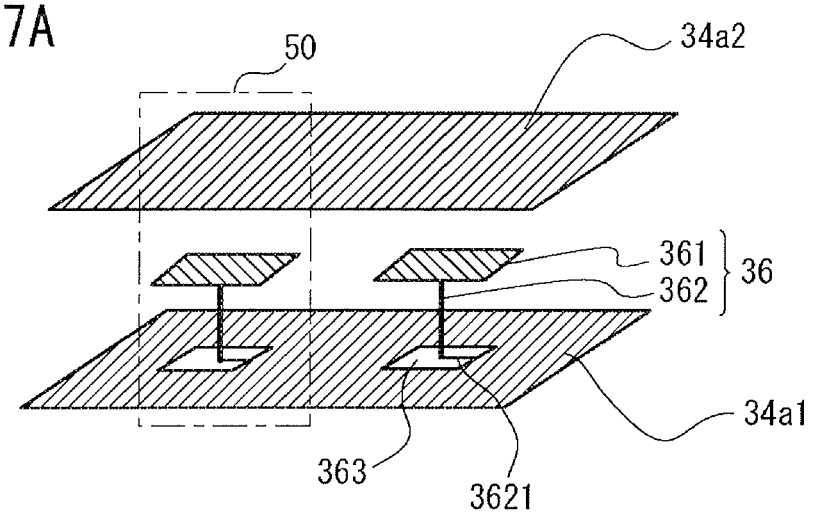
FIG. 7A is a perspective view illustrating a unit cell of a second modified example and FIG. 7B is a perspective view illustrating a unit cell of a third modified example.

FIG. 7A is a perspective view illustrating a unit cell 50 of a second modified example. A conductor component 36 of the unit cell 50 of this modified example is different from the conductor component 36 of this embodiment (see FIG. 5) in that an opening part 363 is formed at a region of a conductor layer 34*a*1 that faces a facing portion 361, and a connection portion 362 and the conductor layer 34*a*1 are connected to each other by an interconnect 3621. The position of the lower end of the connection portion 362 shown in FIG. 7A, i.e. the position of the connection portion 362 in the conductor layer 34*a*1, is located inside the opening part 363.

The size relation between the opening part 363 and the facing portion 361 is not particularly limited. In this embodiment, the facing portion 361 is set to be larger than the opening part 363. Thus, the facing portion 361 covers the opening part 363, when viewed in the surface-normal direction of the conductor layer 34*a*1.

The equivalent circuit of the unit cell 50 shown in FIG. 7A of the second modified example is almost the same as that shown in FIG. 5B. Specifically, the interconnect 3621 and the connection portion 362 function as inductance elements of the unit cell 50. That is, in this modified example, the value of the inductance of the unit cell 50 can be enlarged by providing the opening part 363 and the interconnect 3621.

Figure 7B:
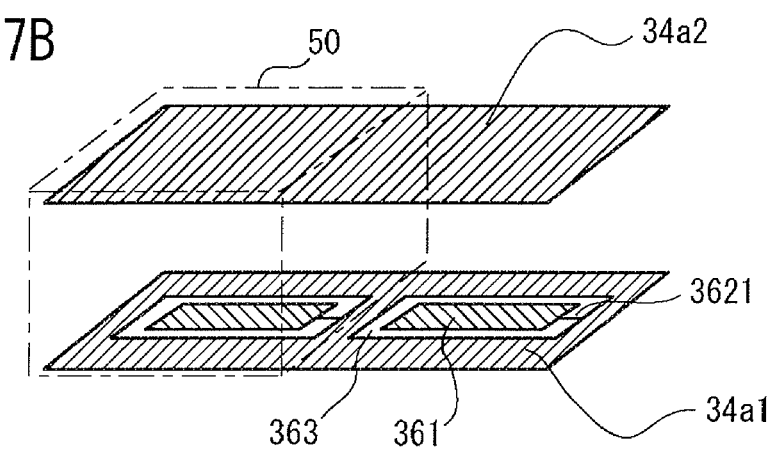

FIG. 7B is a perspective view illustrating a unit cell 50 of a third modified example. The unit cell 50 of this modified example is different from the unit cell 50 according to the second modified example in that the facing unit 361 is formed as an island shape so as to be separated inside an opening part 363. That is, the facing portion 361 of this modified example is formed in the same layer as a conductor layer 34*a*1, and is connected to the conductor layer 34*a*1 by an interconnect 3621 of which width is narrower than the facing portion 361.

The equivalent circuit of the unit cell 50 of the third modified example is almost the same as that shown in FIG. 5B. Specifically, the interconnect 3621 functions as an inductance element of the unit cell 50 instead of the connection portion 362.

The conductor components 36 of this modified example (the facing portion 361) are formed in the same layer as the conductor layer 34*a*1. That is, the conductor components 36 are formed on the side of the front surface 301 further from the conductor layer 34*a* in some cases as in this embodiment (see FIG. 4 and FIG. 5A), or formed in the same layer as the conductor layer 34*a* in other cases as in this modified example.

Note that, the same advantages as those of the second modified example can be obtained in this modified example. Since the unit cell 50 can be formed with the two layers of the conductor layers 34*a*1 and 34*a*2, the interconnect substrate 30 can be made thinner to be improved its flexibility.

Figure 8A:
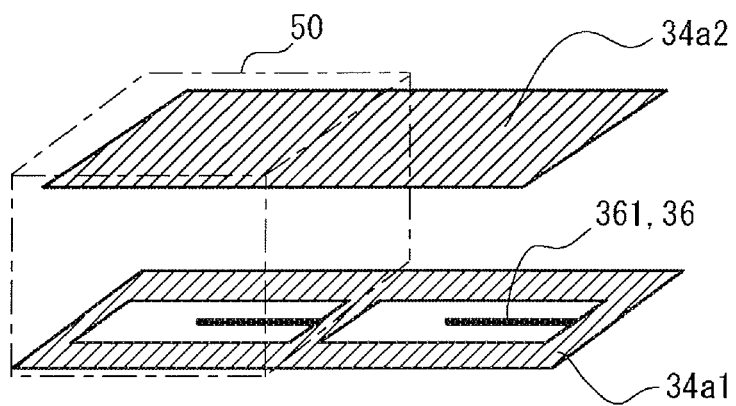
FIG. 8A is a perspective view illustrating a unit cell of a fourth modified example and FIG. 8B is a diagram illustrating an equivalent circuit of the unit cell.

FIG. 8A is a perspective view illustrating a unit cell 50 of a fourth modified example. The unit cell 50 is different from the unit cell 50 shown in FIG. 7B according to the third modified example in that the facing portion 361 does not have a patch, but has a line-shaped open stub type structure.

Figure 8B:
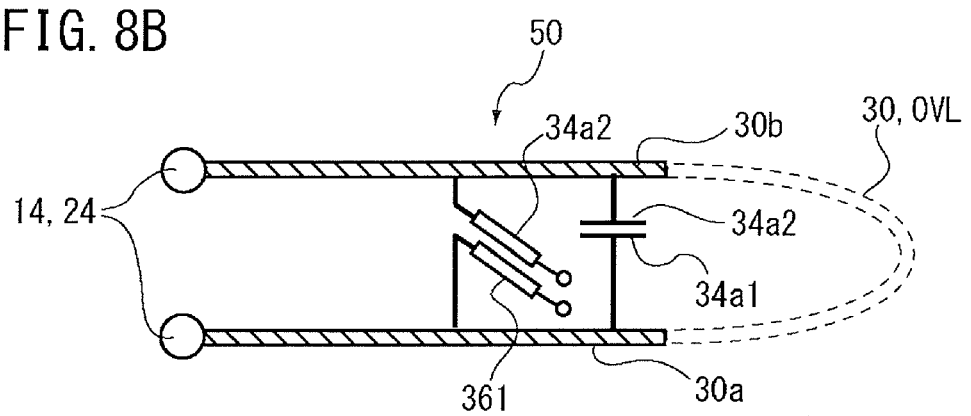

FIG. 8B is a diagram illustrating an equivalent circuit of the unit cell 50 of the fourth modified example. This equivalent circuit is the same as that shown in FIG. 5B except that the equivalent circuit has an open stub instead of the LC serial resonance circuit shown in FIG. 5B. Specifically, the line-shaped facing portion 361 is electrically coupled with the conductor layer 34*a*2 facing the facing portion 361 to form a microstrip line in which the conductor layer 34*a*2 is used as a return path. One end of the microstrip line is an open end, and thus functions as an open stub. Unit cells 50 having such a configuration can be described as the equivalent circuit shown in FIG. 8B in which a parallel plate formed with the conductor layers 34*a*1 and 34*a*2 is shunted as an open stub, and thus the conductor layers 34*a*1 and 34*a*2 are short-circuited to each other at the resonance frequency of the open stub. Since this resonance frequency at which the conductor layers 34*a*1 and 34*a*2 are short-circuited can be controlled by the stub length of the open stub, this resonance frequency can easily be adjusted and the unit cell 50 can be downsized. The facing portion 361 may be formed in not only in the straight shape but also in a curved shape.

In this modified example, the size of the line-shaped facing portion 361 in the longitudinal direction (the right and left directions in FIG. 8A) is greater than the size of the facing portion 361 in the width direction perpendicular to the longitudinal direction. However, the aspect ratio of the facing portion 361 is not particularly limited, as long as the facing portion 361 and the conductor layer 34*a*2 form the microstrip line.

Figure 9A:
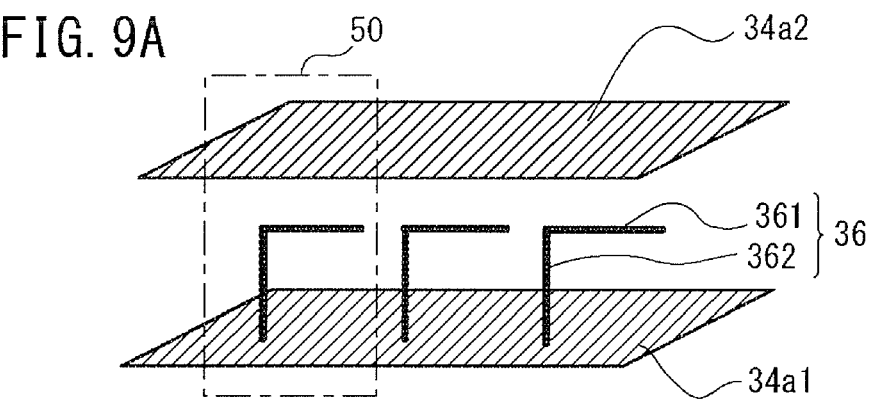
FIG. 9A is a perspective view illustrating a unit cell of a fifth modified example and FIG. 9B is a diagram illustrating an equivalent circuit of the unit cell.

FIG. 9A is a perspective view illustrating a unit cell 50 of a fifth modified example. The unit cell 50 has the same configuration as the unit cell 50 shown in FIG. 5 of this embodiment except that a facing portion 361 has a line shape. The facing portion 361 of this modified example extends parallel to a conductor layer 34*a*1. One end of the facing portion 361 is connected to a connection portion 362 and the other end of the facing portion 361 is configured as an open end.

Figure 9B:
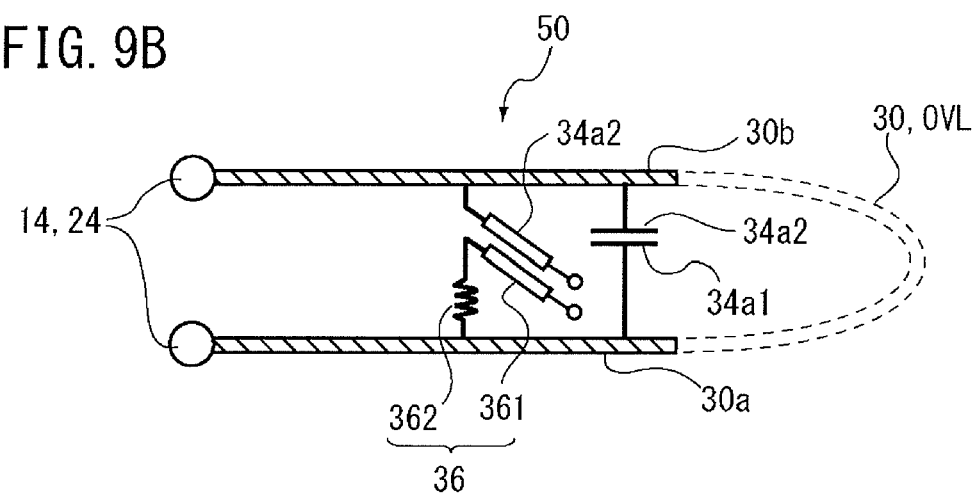

FIG. 9B is a diagram illustrating an equivalent circuit of the unit cell 50 of the fifth modified example. The unit cell 50 of the fifth modified example has the same equivalent circuit as the unit cell 50 of this embodiment shown in FIG. 5B except that the unit cell 50 has an open stub instead of the first capacitance formed with the facing portion 361 and the conductor layer 34*a*2. This open stub is formed with the line-shaped facing portion 361 and a portion of the conductor layer 34*a*2 facing the facing portion 361. Forming the open stub, the unit cell 50 is given large inductance. Therefore, the adjustment range of the characteristics of the metamaterial is broadened.

Second Embodiment

Figure 10A:
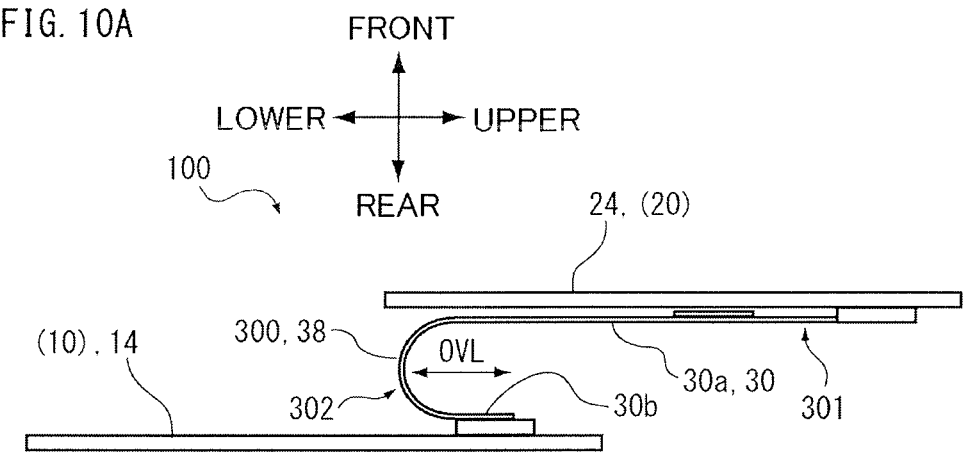
FIG. 10A is a partial schematic view illustrating a first circuit substrate, a second circuit substrate, and an interconnect substrate in an opened state of a radio communication apparatus of a second embodiment
Figure 10B:
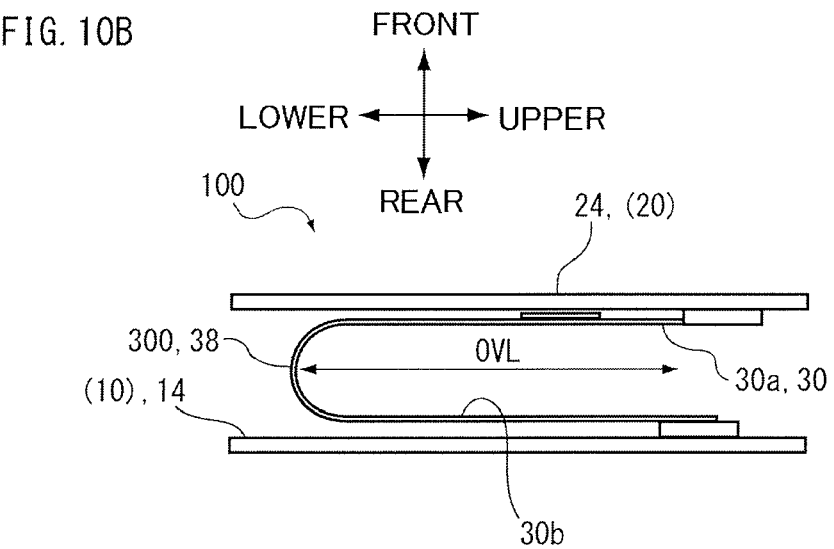
FIG. 10B is a partial schematic view illustrating the first circuit substrate, the second circuit substrate, and the interconnect substrate in the closed state of the radio communication apparatus of the second embodiment.

FIG. 10 is a partial schematic view illustrating a first circuit substrate 14, a second circuit substrate 24, and an interconnect substrate 30 in a radio communication apparatus 100 of a second embodiment. FIG. 10A shows an open state in which the second casing 20 is slid upward with respect to the first casing 10. FIG. 10B shows a closed state in which the second casing 20 is slid downward with respect to the first casing 10. The radio communication apparatus 100 of this embodiment is different from the radio communication apparatus shown in FIGS. 1 and 2 according to the first embodiment in that an overlapping region OVL of the interconnect substrate 30 in the opened state is greater than the overlapping region OVL of the interconnect substrate 30 in the closed state.

That is, in the radio communication apparatus 100 according to the present invention, the second state in which the interconnect substrate 30 is extended may be the opened state as in this embodiment (see FIG. 10A) or may be the closed state as in the first embodiment (see FIG. 1B).

In this embodiment, the inside of the overlapping region OVL which is mainly the side of the rear surface in the second state is referred to as a front surface 301 of the interconnect substrate 30. In contrast, the outside of the overlapping region OVL which is mainly the side of the front surface in the second state is referred to as a rear surface 302 of the interconnect substrate 30. In the interconnect substrate 30 of this embodiment, as in the first embodiment, the front surface section 30a and the rear surface section 30b are short-circuited by conductor components 36 that is electrically connected to a conductor layer 34 and located on the inside of the overlapping region OVL (see FIG. 5). Accordingly, the noise flowing in the conductor layer 34 can be reduced between the conductor component 36 and the half folded portion 38.

Here, in general, an antenna device 40 is disposed in the upper end of the first casing 10 due to various restrictions as shown in FIG. 1. Accordingly, the overlapping region OVL does not face the antenna device 40 in the second embodiment, whereas the overlapping region OVL faces the antenna device 40 in the first embodiment. Accordingly, the advantage of short-circuiting the overlapping region OVL by the conductor components 36 and reducing noise to the antenna device 40 can be obtained more reliably than in the radio communication apparatus 100 according to the first embodiment.

Third Embodiment

Figure 11:
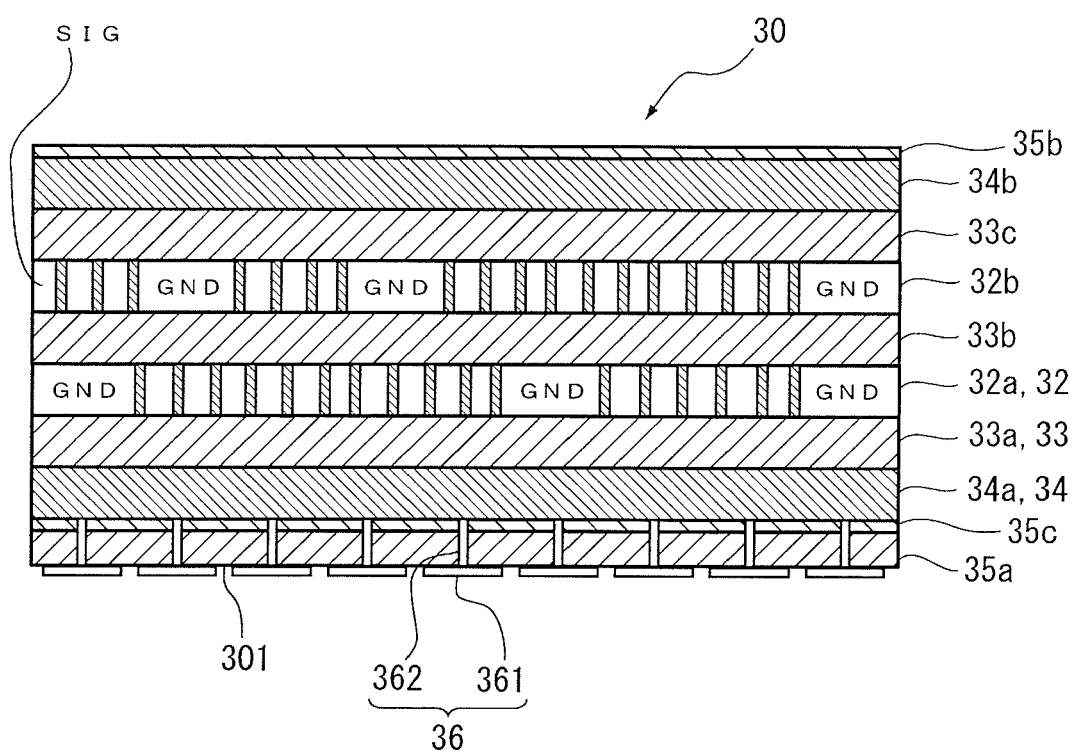
FIG. 11 is a sectional view illustrating the lamination of an interconnect substrate of a third embodiment.

FIG. 11 is a sectional view illustrating the lamination of an interconnect substrate 30 of a third embodiment of the present invention. The interconnect substrate 30 of this embodiment is different from that according to the first embodiment (see FIG. 4) in that an adhesion layer 35c is interposed between a coat layer 35a and a conductor layer 34a.

One surface of the adhesion layer 35c (lower surface) is joined to the coat layer 35a. The front end of a connection portion 362 vertically drooping from the facing portion 361 is located at the same height as the other surface of the adhesion layer 35c (upper surface). In other words, the front end of the connection portion 362 is flush with the adhesion layer 35c. Further, the connection portion 362 is electrically connected to the conductor layer 34a by joining the adhesion layer 35c to the conductor layer 34a. Since the adhesion layer 35c slightly contracts over time in the surface-normal direction, the connection portion 362 and the conductor layer 34a are densely connected to each other. Thus, the conductor components 36 can be installed easily at a desired region in the conductor layer 34a of the existing interconnect substrate 30 by preparing an adhesive sheet or tape in which the coat layer 35a and the conductor components 36 are integrated with each other in advance.

Fourth Embodiment

Figure 12:
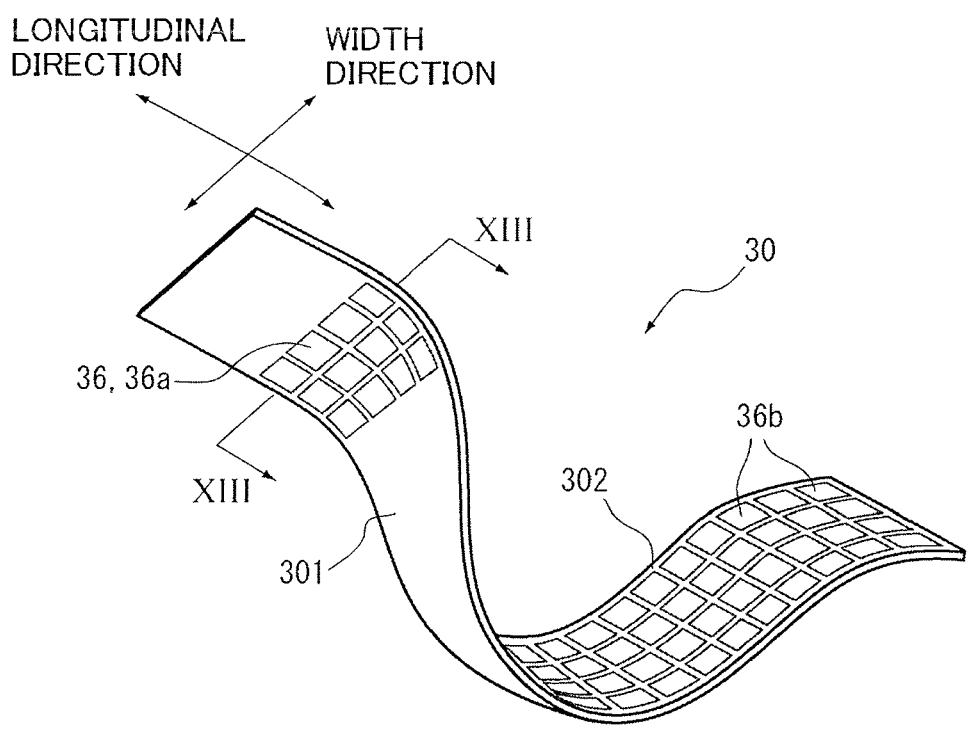
FIG. 12 is a perspective view schematically illustrating an interconnect substrate of a radio communication apparatus of a fourth embodiment.
Figure 13:
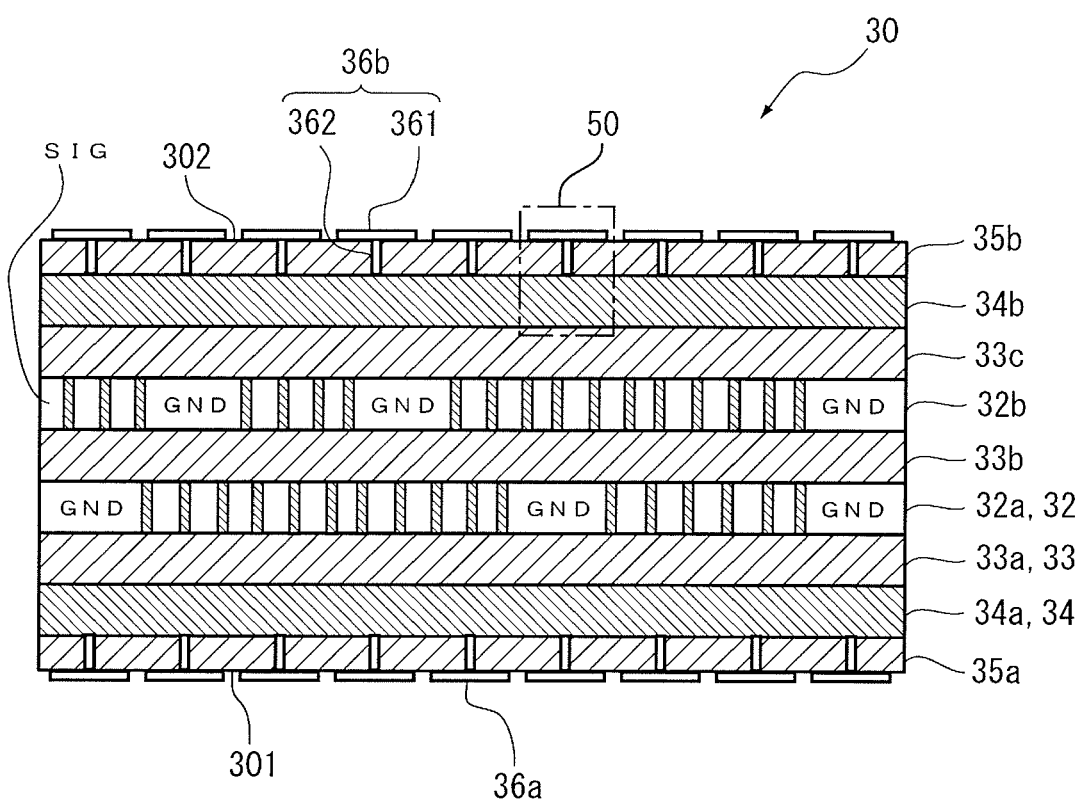
FIG. 13 is a sectional view taken along line XIII-XIII of FIG. 12.

FIG. 12 is a perspective view schematically illustrating an interconnect substrate 30 used for a radio communication apparatus 100 of a fourth embodiment of the present invention. FIG. 13 is a sectional view taken along the line XIII-XIII of FIG. 12. In FIG. 12, the dimensions of the conductor component 36 (unit cell 50) are exaggerated.

The interconnect substrate 30 of this embodiment includes not only the conductor components 36 (36a) described in the first embodiment but also reflection structures 36b that reflect the electromagnetic wave of the communication frequency of the radio communication apparatus 100. The reflection structure 36b forms a left-handed metamaterial. Accordingly, the conductor component 36a forming a right-handed metamaterial and the reflection structure 36b of this embodiment form different kinds of metamaterials.

Here, the fact that the conductor component 36a or the reflection structure 36b has the metamaterial or EBG structure means that the conductor component 36a or the reflection structure 36b forms a part or the entirety of the unit cell 50 of the metamaterial or EBG structure. Further, a case in which the reflection structure 36b reflects the electromagnetic wave of the communication frequency of the radio communication apparatus 100 includes a case in which the reflection structure 36b reflects the electromagnetic wave in cooperation with another element forming the EBG structure together (conductor layer 34b).

The reflection structure 36b is a second conductor component and forms a left-handed metamaterial between the reflection structure 36b and a conductor plane (conductor layer 34b). More specifically, in the interconnect substrate 30 of this embodiment, the reflection structure 36b and a partial region facing the reflection structure 36b in the conductor layer 34b form the EBG structure. FIG. 13 shows the mushroom-shaped reflection structure 36b for convenience. A specific example of a preferable EGB structure used for the reflection structure 36b will be described in detail below.

The interconnect substrate 30 of this embodiment reflects the electromagnetic wave of the communication frequency of the antenna device 40 with the left-handed EBG structure formed with the reflection structure 36b and a second conductor layer 34b. Thus, a first circuit substrate 14 and a second circuit substrate 24 located on the rear side of the interconnect substrate 30, when viewed from the antenna device 40 (see FIG. 1), can be screened from the antenna device 40. Therefore, it is able to be prevented that high-frequency noise coming from the first circuit substrate 14 or the second circuit substrate 24 is propagated from the conductor layer 34b to the antenna device 40 and becomes noise for the communication frequency, and the communication quality of the radio communication apparatus 100 can be stabilized. Here, the fact that a substrate is screened from the antenna device 40 means a state in which at least part of the electromagnetic wave transmitted and received between the substrate and the antenna device 40 is reduced by other physical elements.

It is preferable that the reflection structure 36b faces the antenna device 40 in at least one of the first and second states. Accordingly, when the antenna device 40 is disposed in the upper end of the first casing 10, as shown in FIG. 1, it is preferable that the reflection structures 36b are disposed on the side of the rear surface 302 of the rear surface section 30b of the interconnect substrate 30 in the first embodiment described with reference to FIGS. 2 and 5. On the other hand, in the second embodiment described with reference to FIG. 10, it is preferable that the reflection structures 36b are disposed on the front surface 301 of the front surface section 30a of the interconnect substrate 30. Accordingly, the reflection structures 36b may be disposed on the opposite surface to the conductor components 36a connected to the conductor layer (the first conductor layer 34a), may be disposed on the same surface as the conductor components 36a, or may be disposed on both surfaces of the interconnect substrate 30.

The EBG structure formed with the reflection structure 36b and the conductor layer 34b of this embodiment also functions to attenuate noise propagating in a coat layer 35b of the interconnect substrate 30. Here, the noise of various operation frequencies of the radio communication apparatus 100 (e.g. clock frequency and communication frequency of an element) propagates in the coat layer 35b in some cases. It is therefore preferable that the reflection structure 36b has dimensions with which both of a function being as a reflection plate to any communication frequency of the radio communication apparatus 100 and a function of attenuating the noise of the operation frequency of the radio communication apparatus 100 are realized.

In this embodiment, a case in which the reflection structures 36b are installed on the rear surface 302 of the interconnect substrate 30 will be described below as an example applied to the radio communication apparatus 100 of the first embodiment.

The reflection structure 36b and the second conductor layer 34b of this embodiment form a left-handed metamaterial. The reflection structure 36b of this embodiment functions as a left-handed metamaterial in both the first state in which the interconnect substrate 30 is folded and the area of the overlapping region OVL is large, and the second state in which the interconnect substrate 30 is extended and the area of the overlapping region OVL is small.

The reflection structures 36b are disposed in the same layer as the second conductor layer 34b on the side of the rear surface 302 of the conductor layer 34a, or are laminated on the side of the rear surface 302 further from the second conductor layer 34b with the interconnect layers 32 interposed between the reflection structures 36b and the conductor layer 34a. A facing portion 361 of the reflection structure 36b shown in FIG. 13 is disposed on the side of the rear surface 302 of the coat layer 35b. A connection portion 362 is formed through the coat layer 35b and electrically connects the facing portion 361 to the second conductor layer 34b.

The thickness of the coat layer 35b is set to have dimensions with which a facing gap between the facing portion 361 and the second conductor layer 34b can be adjusted to a desired gap. In terms of this meaning, the coat layer 35b of this embodiment may be thicker than the coat layer 35b according to the first embodiment (see FIG. 4).

Here, the conductor component 36a has the EBG structure in order to short-circuit the overlapping region OVL. Therefore, it is sufficient to install a single conductor component, or the plurality of conductor components locally in the overlapping region OVL. In contrast, since the reflection structures 36b form the EBG structure in order to conceal the substrates such as the second circuit substrate 24 from the antenna device 40, it is preferable that the reflection structures 36b are disposed at a regular interval in a broad range. Therefore, the conductor components 36a of this embodiment are disposed locally with respect to the conductor layer 34a, and a greater number of the reflection structures 36b than the conductor components 36a are disposed with respect to the second conductor layer 34b. More specifically, the conductor components 36a are disposed locally in the vicinity of the neck portion 37 of one surface of the interconnect substrate 30 (see FIGS. 2 and 5), and the reflection structures 36b are disposed substantially entirely on the other surface of the interconnect substrate 30.

Hereinafter, the reflection structure 36b of this embodiment will be described in detail.

The reflection structures 36b forming a left-handed EBG structure of this embodiment have a common feature in which each reflection structure 36b includes a first capacitance formed with the conductor plane (the conductor layer 34b) and the facing portion 361 facing each other and an inductance element connected in series to the first capacitance.

Figure 14A:
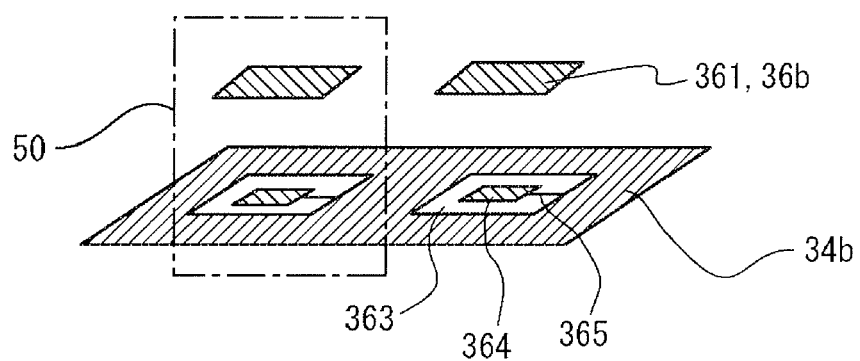
FIG. 14A is a perspective view schematically illustrating a first example of a reflection structure and FIG. 14B is an equivalent circuit diagram illustrating a unit cell of the first example of the reflection structure.
Figure 14B:
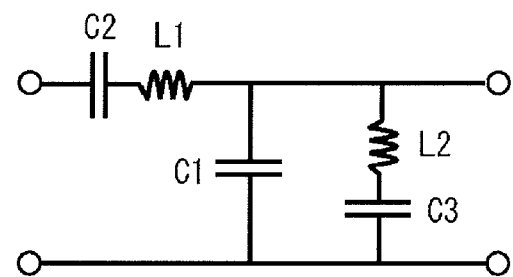

FIG. 14A is a perspective view schematically illustrating a first example of the reflection structure 36b. FIG. 14B is an equivalent circuit diagram illustrating a unit cell 50 of the reflection structure 36b of the first example. The unit cell 50 of the first example includes a patch-shaped facing portion 361 that faces the conductor layer 34b outside the conductor layer 34b, an opening part 363 that is formed in the conductor layer 34b, a conductor piece 364 that is formed in an island shape inside the opening part 363, and an interconnect 365 that connects the conductor piece 364 to the conductor layer 34b. The conductor piece 364 and the interconnect 365 are formed in the same layer as the conductor layer 34b. The reflection structure 36b of this embodiment includes the facing portion 361, a conductor piece 364, and an interconnect 365.

A capacitance C1 is formed between the facing portion 361 and the conductor layer 34b. A capacitance C2 and inductance L1 are formed between the adjacent facing portions 361. A capacitance C3 is formed between the facing portion 361 and the conductor piece 364. The interconnect 365 has inductance L2.

Figure 15A:
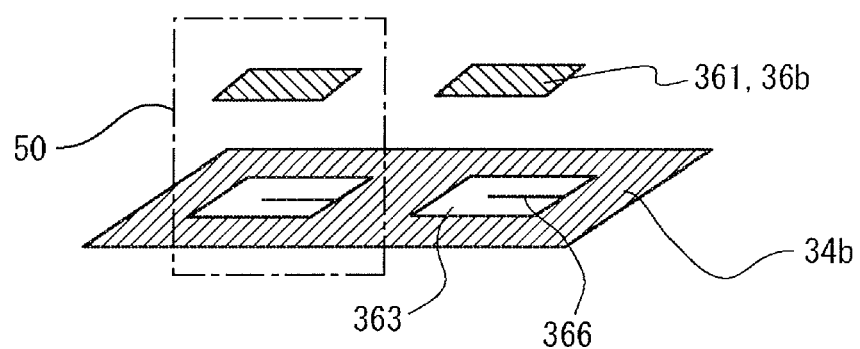
FIG. 15A is a perspective view schematically illustrating a second example of the reflection structure and FIG. 15B is an equivalent circuit diagram illustrating a unit cell of the second example of the reflection structure.
Figure 15B:
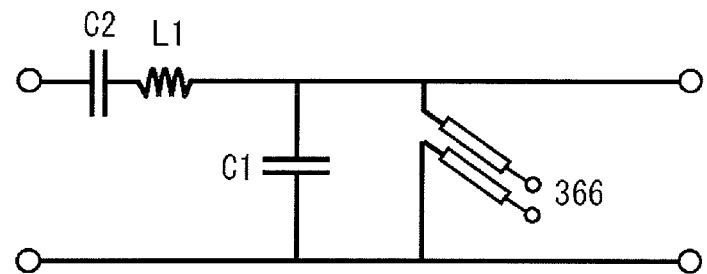

FIG. 15A is a perspective view schematically illustrating a second example of the reflection structure 36b. FIG. 15B is an equivalent circuit diagram illustrating a unit cell 50 of the reflection structure 36b of the second example. The unit cell 50 of the second example is different from the unit cell 50 of the first example in that the unit cell 50 is of an open stub type that includes a line-shaped microstrip line 366 instead of the conductor piece 364 and the interconnect 365 shown in FIG. 14A. One end of the microstrip line 366 is connected to the conductor layer 34b and the other end of the microstrip line 366 is an open end. The reflection structure 36b of this embodiment includes the facing portion 361 and the microstrip line 366.

Figure 16A:
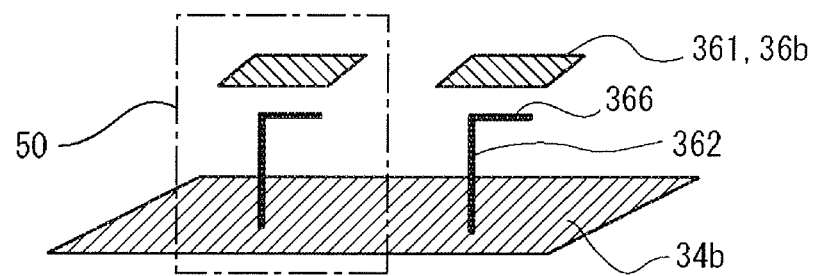
FIG. 16A is a perspective view schematically illustrating a third example of the reflection structure and FIG. 16B is a perspective view schematically illustrating a fourth example of the reflection structure.

FIG. 16A is a perspective view schematically illustrating a third example of the reflection structure 36b. The equivalent circuit diagram of the unit cell 50 of the third example is the same as that of the second example (see FIG. 15B). The unit cell 50 of the third example is different from the unit cell 50 of the second example in that the microstrip line 366 is formed in a layer different from the conductor layer 34b, and one end of the microstrip line 366 and the conductor layer 34b are connected by the connection portion 362. The other end of the microstrip line 366 is an open end. Thus, the microstrip line 366 is connected in series to the inductance of the connection portion 362, and high inductance L2 can be obtained. The microstrip line 366 of the third example is formed in an intermediate layer between the facing portion 361 and the conductor layer 34b. The reflection structure 36b of this embodiment includes the facing portion 361, the microstrip line 366, and the connection portion 362.

Figure 16B:
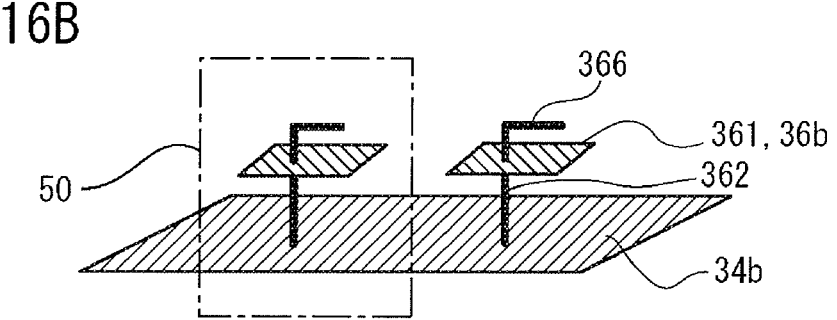

FIG. 16B is a perspective view schematically illustrating a fourth example of the reflection structure 36b. The equivalent circuit diagram of the unit cell 50 of the fourth example is the same as that of the second example (see FIG. 15B). The unit cell 50 of the fourth example is different from the unit cell 50 of the third example in that the microstrip line 366 is located on the opposite side of the conductor layer 34b with the facing portion 361 interposed therebetween. That is, the connection portion 362 of the fourth example is formed through the facing portion 361 and connects one end of the microstrip line 366 to the conductor layer 34b. Thus, the inductance of the connection portion 362 can be increased. The reflection structure 36b of this embodiment also includes the facing portion 361, the microstrip line 366, and the connection portion 362.

Figure 17A:
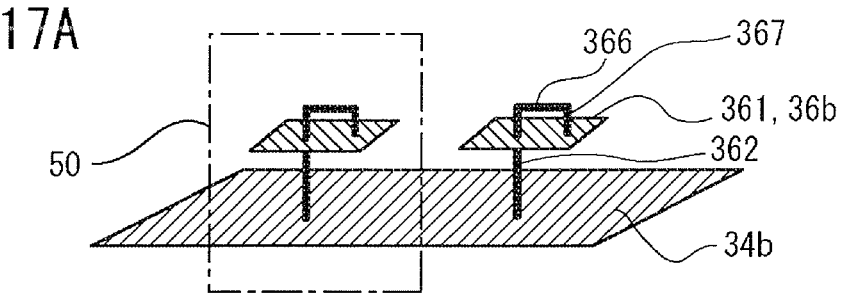
FIG. 17A is a perspective view schematically illustrating a fifth example of the reflection structure and FIG. 17B is an equivalent circuit diagram illustrating a unit cell of the fifth example of the reflection structure.
Figure 17B:
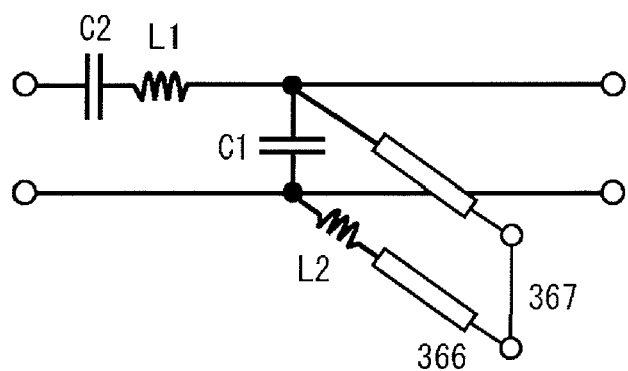

FIG. 17A is a perspective view schematically illustrating a fifth example of the reflection structure 36b. FIG. 17B is an equivalent circuit diagram illustrating a unit cell 50 of the reflection structure 36b of the fifth example. The unit cell 50 of the fifth example is different from the unit cell 50 of the fourth example in that the front end of the microstrip line 366 is not an open end and is short-circuited to the facing portion 361 by the second connection portion 367. The unit cell 50 includes an impedance portion formed with the inductance L1 and the capacitance C2, and an admittance portion formed with the microstrip line 366, the second connection portion 367, the capacitance C1, and the inductance L2. The reflection structure 36b of this embodiment includes the facing portion 361, the microstrip line 366, the connection portion 362, and the second connection portion 367.

Since the unit cell 50 shown in FIGS. 14 and 15 can be implemented with two layers while the unit cell 50 shown in FIGS. 16 and 17 can be implemented with three layers, the unit cell 50 shown in FIGS. 14 and 15 can be implemented with a thinner left-handed EBG structure, and is therefore preferable to that shown in FIG. 16 and FIG. 17.

In the first to fourth embodiments described above, a change in the antenna characteristics of the radio communication apparatus 100 is reduced by short-circuiting the interconnect substrate 30 to suppress the reverse-phase current that may be generated when the interconnect substrate 30 interconnecting the first casing 10 and the second casing 20 is folded.

Figure 33A:
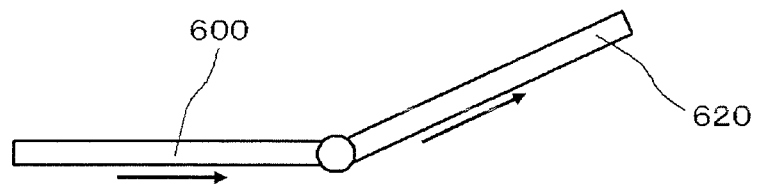
FIG. 33A is a schematic diagram illustrating an opened state of first and second casings and FIG. 33B is a schematic diagram illustrating a closed state of the first and second casings, each of which is a schematic diagram for describing a problem.
Figure 33B:
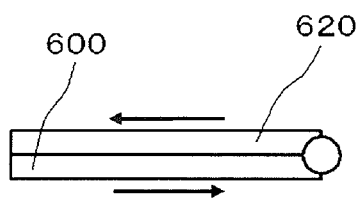

On the other hand, reverse-phase currents could be generated even when the casings are folded to overlap. This problem will be described bellow. A radio wave output from an antenna device interferes with a conductor other than the antenna device of a radio communication apparatus and generates current. In this case, this conductor also functions as an antenna device. Here, it is considered that a radio communication terminal has a configuration in which first and second casings are mounted to be rotatable on each other. As shown in FIG. 33A, when a first casing 600 does not overlap with a second casing 620, the current generated in the first casing 600 does not interfere with the current generated in the second casing 620. On the other hand, as shown in FIG. 33B, when the first casing 600 overlaps with the second casing 620, a current loop is formed with the first casing 600 and the second casing 620. Therefore, the direction of the current flowing in the first casing 600 is opposite to the direction of the current flowing in the second casing 620. In this case, since the phases of the radio waves output from the first casing 600 and the second casing 620 are shifted one another in a cancellation direction, the antenna function of the first casing 600 and the second casing 620 may deteriorate.

Radio communication apparatuses according to fifth to seventh embodiments to be described below are configured to suppress such revere-phase current and reduce a change in the antenna characteristics.

Fifth Embodiment

Figure 18:
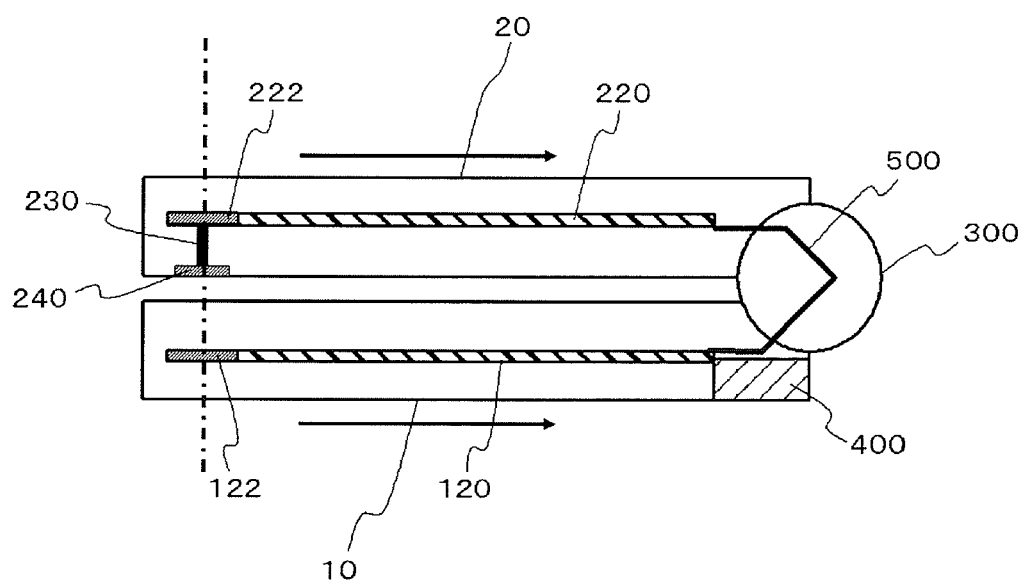
FIG. 18 is a schematic sectional view illustrating the configuration of a radio communication apparatus of a fifth embodiment.

FIG. 18 is a schematic perspective view illustrating the configuration of a radio communication apparatus of the fifth embodiment. The radio communication apparatus includes a first casing 10, a second casing 20, a connection section 300, an antenna device 400, a first conductor 122, and a plurality of second conductors 240. The connection section 300 is, for example, a hinge. The connection section 300 mounts one end of the first casing 10 on one end of the second casing 20 to be rotatable so that the first casing 10 and the second casing 20 overlap with each other. The first casing 10, the second casing 20, or the connection section 300 has the antenna device 400 therein. In the example shown in the drawing, the first casing 10 has the antenna device 400 on one end thereof. The first casing 10 has the first conductor 122 therein. The second casing 20 has the plurality of second conductors 240 therein. The second conductors 240 are arranged in a repetitive manner at positions facing the first conductor 122, when the first casing 10 and the second casing 20 overlap with each other.

Any constant potential such as a ground potential is given to the first conductor 122. The description will be made in detail below.

The radio communication apparatus is, for example, a cellular phone. The first casing 10 includes an operation keyboard (not shown) and a first circuit substrate 120. The second casing 20 includes a display panel. The display panel includes a second circuit substrate 220. The first circuit substrate 120 controls the radio communication apparatus, and the second circuit substrate 220 controls the display panel. The first circuit substrate 120 and the second circuit substrate 220 are connected to each other through a flexible substrate 500. The flexible substrate 500 passes through the connection section 300.

The antenna device 400 is connected to the first circuit substrate 120 and outputs a radio wave for communication. In an example shown in this drawing, the antenna device 400 is disposed at the end of the first casing 10 on which the connection section 300 is mounted. The first conductor 122 and the plurality of second conductors 240 are disposed at the opposite end to the antenna device 400.

In the example shown in this drawing, the second casing 20 includes a third conductor 222 and a plurality of connection portions 230. The third conductor 222 is a sheet-shaped conductor and is disposed at a position facing the plurality of second conductors 240. The connection portion 230 is, for example, a via. Each of the plurality of second conductors 240 is connected to the third conductor 222. When the first casing 10 and the second casing 20 overlap with each other, the second conductors 240 are located to be closer to the first casing 10 than the third conductor 222 is.

When the first casing 10 and the second casing 20 overlap with each other, the first conductor 122 faces the plurality of second conductors 240 without any conductor such as a metal plate or a metal layer interposed therebetween.

The first conductor 122 is formed as a part of the first circuit substrate 120, and the third conductor 222 is formed as a part of the second circuit substrate 220. A constant potential such as a ground potential is given to the first conductor 122 through an interconnect in the first circuit substrate 120, and to the third conductor 222 through an interconnect in the second circuit substrate 220.

Figure 19:
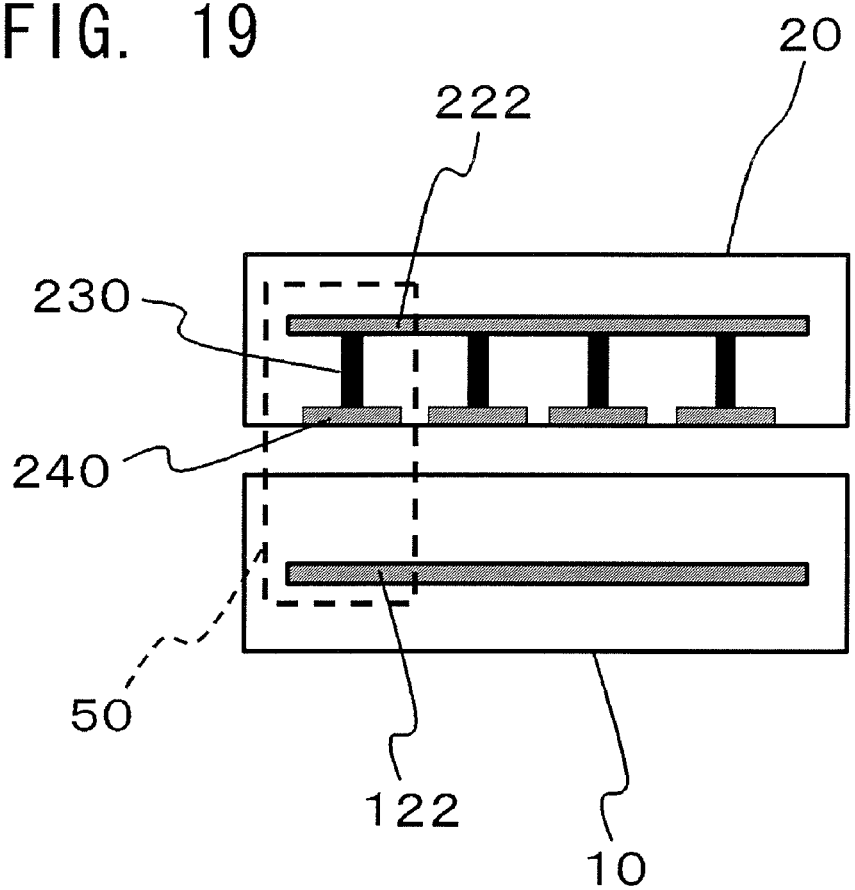
FIG. 19 is a diagram illustrating the cross-sectional surface indicated by a one-dot chain line of FIG. 18.
Figure 20:
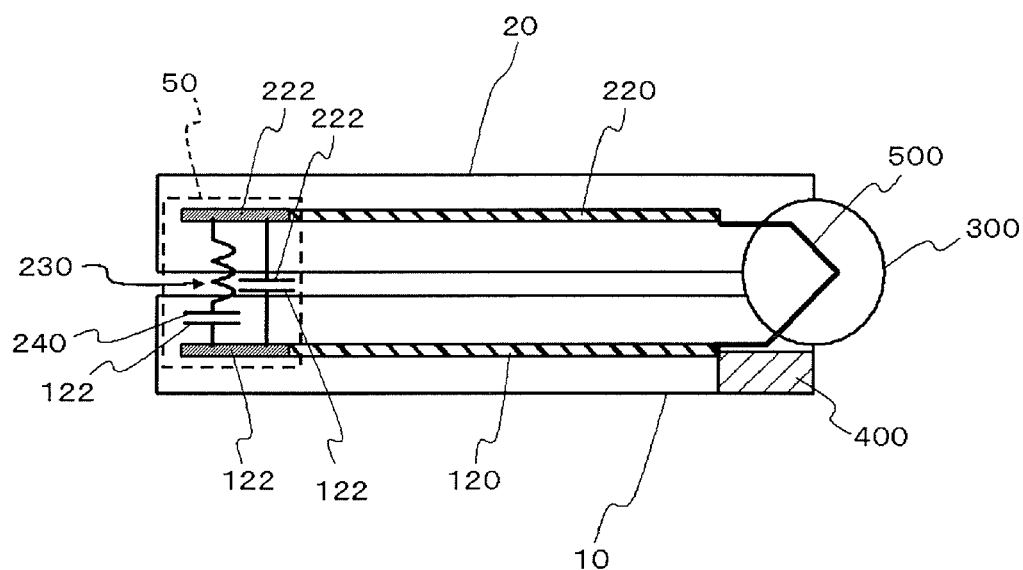
FIG. 20 is an equivalent circuit diagram illustrating a unit cell.

FIG. 19 is a diagram illustrating the cross-sectional surface indicated by a one-dot chain line of FIG. 18. FIG. 20 is an equivalent circuit diagram illustrating a unit cell 50. As described above, for example, the second conductors 240 are arranged in a repetitive manner (e.g. at a regular interval) in the width direction of the radio communication apparatus. A unit cell 50 of the metamaterial is formed with the first conductor 122, the second conductor 240, the third conductor 222, and the connection portion 230. The unit cell 50 is a unit cell having a so-called mushroom-shape. Specifically, as shown in FIG. 20, the connection portion 230 functions as an inductance element of the unit cell 50. The second conductor 240 and the first conductor 122 function as a first capacitance of the unit cell 50, and the first conductor 122 and the third conductor 222 function as a second capacitance of the unit cell 50. Although not illustrated, the third capacitance is formed between the adjacent second conductors 240. For example, the unit cells 50 are arranged in a repetitive manner (e.g. at a regular interval) in the width direction of an end of the radio communication apparatus. In the metamaterial, the band-gap frequency band does not include the communication frequency of the radio communication apparatus. That is, the first circuit substrate 120 and the second circuit substrate 220 can be regarded as one sheet of conductor, since the first circuit substrate 120 and the second circuit substrate 220 are electrically connected to each other by the metamaterial at the communication frequency of the radio communication apparatus.

Here, when the unit cells 50 are arranged in the "repetitive" manner, it is preferable that the gap between the same connection portions of the adjacent unit cells 50 (the center-to-center distance) is less than half of the wavelength λ of the electromagnetic wave used for communication.

Next, the mode of operations and the advantages of this embodiment will be described. According to this embodiment, the unit cell 50 of the metamaterial is formed with the first conductor 122, the second conductor 240, the third conductor 222, and the connection portion 230, when the first casing 10 faces the second casing 20. In the metamaterial, the band-gap frequency band does not include the communication frequency of the radio communication apparatus. Therefore, since the first circuit substrate 120 and the second circuit substrate 220 are electrically connected to each other through the metamaterial at the communication frequency of the radio communication apparatus, the first circuit substrate 120 and the second circuit substrate 220 can be regarded as one sheet of conductor. This advantage can be obtained, even when a single unit cell 50 of the metamaterial is present. However, this advantage can be obtained more reliably when the plurality of unit cells 50 are arranged in the repetitive manner.

The radio wave output from the antenna device 400 interferes with a conductor other than the antenna device, such as the first circuit substrate 120 and the second circuit substrate 220, of the radio communication apparatus and generates current. Therefore, the first circuit substrate 120 and the second circuit substrate 220 also function as an antenna. As described above, the first circuit substrate 120 and the second circuit substrate 220 can be regarded as one sheet of conductor at the communication frequency of the radio communication apparatus. Accordingly, the phase of the current generated in the first circuit substrate 120 is the same as that of the current generated in the second circuit substrate 220. As a result, it is possible to suppress the deterioration in the antenna characteristics of the first circuit substrate 120 and the second circuit substrate 220, when the first casing 10 faces the second casing 20.

Sixth Embodiment

Figure 21:
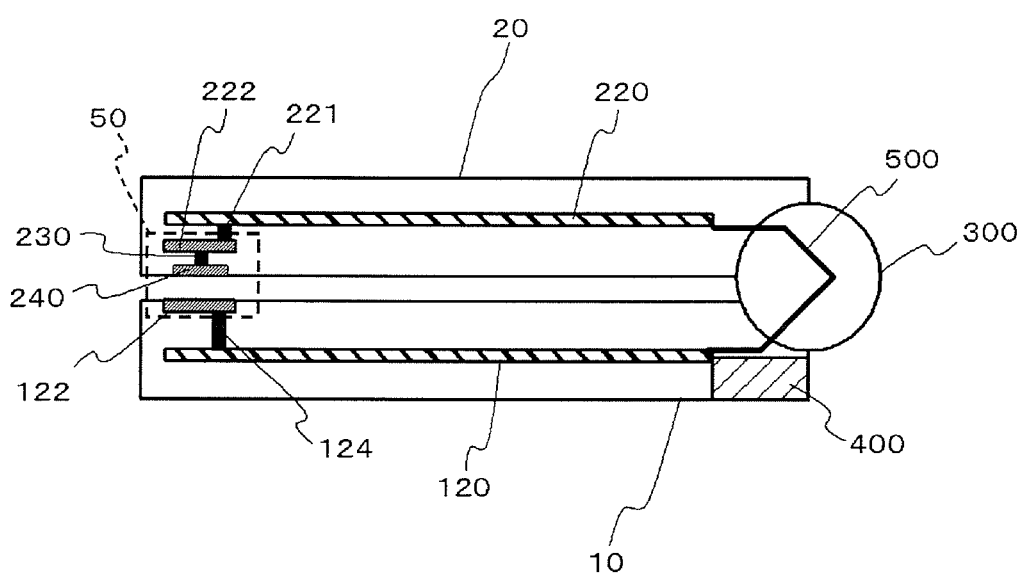
FIG. 21 is a sectional view illustrating the configuration of a radio communication apparatus of a sixth embodiment.

FIG. 21 is a sectional view illustrating the configuration of a radio communication apparatus of a sixth embodiment. The radio communication apparatus has the same configuration as the radio communication apparatus of the fifth embodiment except for the positions of the first conductor 122 and the third conductor 222 in the thickness direction of the casing.

In this embodiment, the first conductor 122 is separated from the first circuit substrate 120. Specifically, the first conductor 122 is located to be closer to the second casing 20 than the first circuit substrate 120 is, and is formed of, for example, a metal plate. The first conductor 122 is connected to either a power line or a ground line of the first circuit substrate 120 through the connection portion 124 such as a via.

The third conductor 222 is separated from the second circuit substrate 220. Specifically, the third conductor 222 is located between the second circuit substrate 220 and the second conductor 240, and is formed of, for example, a metal plate. The third conductor 222 is connected to either a power line or a ground line of the second circuit substrate 220 through a connection portion 221 such as a via.

In this embodiment, the same advantages as those of the fifth embodiment can be obtained. Since the first conductor 122 can be located to be close to the second conductor 240, the capacitance of the unit cell 50 can be increased. Further, since the third conductor 222 can be located to be close to the first conductor 122, the capacitance of the unit cell 50 can be increased. As a result, the adjustment range of the characteristics of the metamaterial can be broadened.

Figure 22:
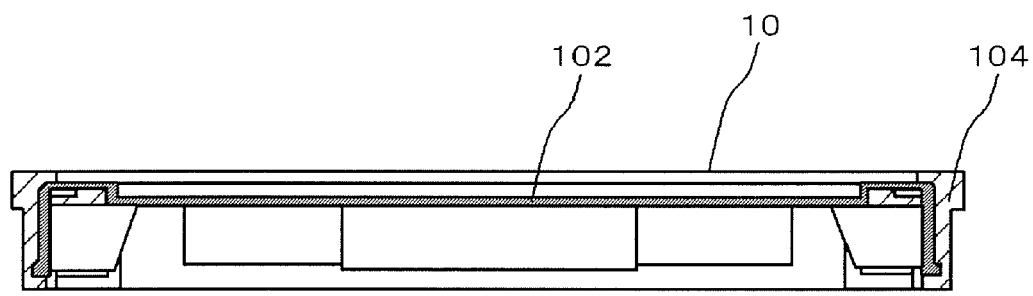
FIG. 22 is a diagram illustrating an example of the cross-sectional configuration of a casing.

In the sixth embodiment, as shown in the sectional view of FIG. 22, it is considered that the first casing 10 is formed using a first metal structure 102 and a resin layer 104. A first metal structure 102 is a structure that serves as a base of the first casing 10, and is formed by performing press processing on a metal plate. The resin layer 104 is formed at least on the outer surface of the first casing 10 in the first metal structure 102. In this case, the first conductor 122 may be formed in a part of the first metal structure 102.

Likewise, in the fifth and sixth embodiments, it is considered that the second casing 20 is formed with a second metal structure and a resin layer. Since the configuration of the second metal structure and the resin layer is the same as the configuration of the first metal structure 102 and the resin layer 104, the configuration of the second metal structure and the resin layer are not illustrated. In this case, the second conductor 240 may be formed in a part of the second metal structure.

Note that, in the fifth and sixth embodiments, the configurations of the unit cell 50 are not limited to those described the above examples. Hereinafter, some modified examples of the unit cell 50 will be described.

Figure 23A:
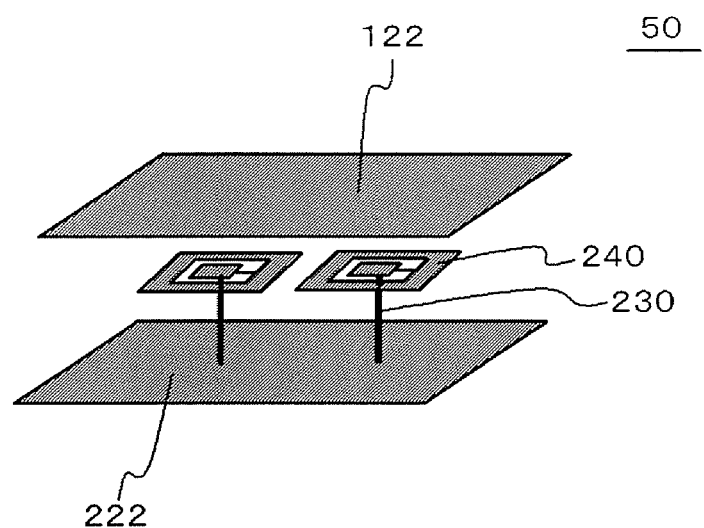
FIG. 23A is a perspective view illustrating a unit cell of a first modified example of the fifth and sixth embodiments and FIG. 23B is a plan view illustrating a second conductor shown in FIG. 23A.
Figure 23B:
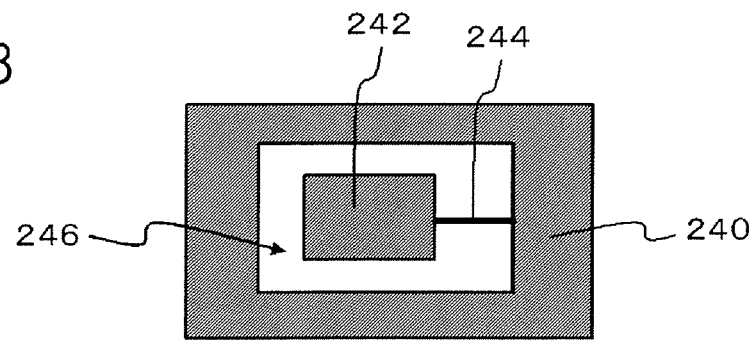

FIG. 23A is a perspective view illustrating a unit cell 50 of a first modified example. FIG. 23B is a plan view illustrating a second conductor 240 shown in FIG. 23A. In this modified example, a unit cell 50 has the same configuration as the unit cell 50 of the fifth and sixth embodiments except that an opening part 246, a conductor 242, and an interconnect 244 are formed in the second conductor 240. The conductor 242 is formed in an island shape inside the opening part 246, and the interconnect 244 interconnects the conductor 242 with the second conductor 240. The connection portion 230 is connected to the conductor 242.

Figure 24:
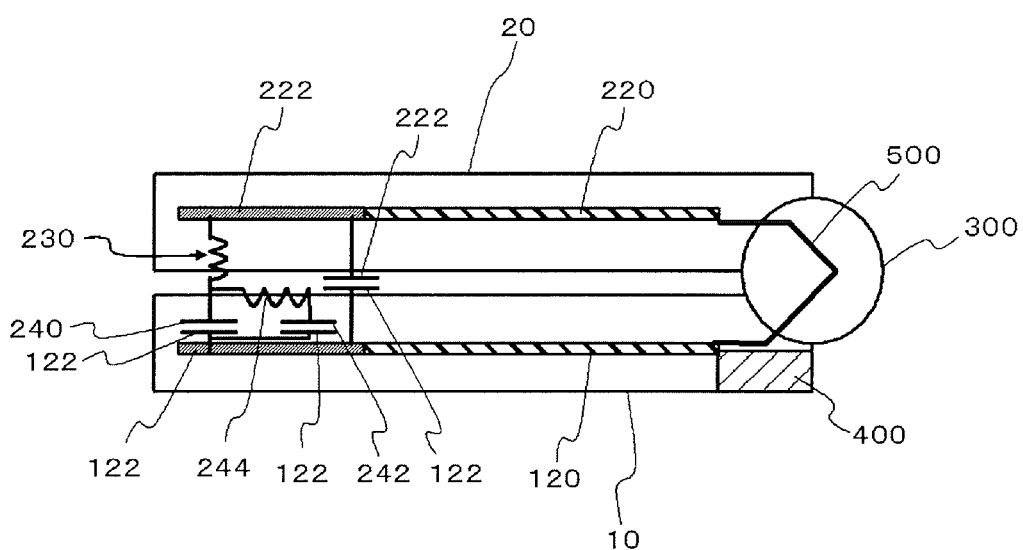
FIG. 24 is an equivalent circuit diagram illustrating a unit cell shown in FIG. 23A.

FIG. 24 is an equivalent circuit diagram illustrating the unit cell 50 shown in FIG. 23. As in the example shown in FIG. 20, the connection portion 230 functions as an inductance element of the unit cell 50. A second conductor 240 and a first conductor 122 function as a first capacitance of the unit cell 50, and the first conductor 122 and a third conductor 222 function as a second capacitance of the unit cell 50. Although not illustrated, the third capacitance is formed between the adjacent second conductors 240. A second inductance element formed with the interconnect 244 is connected in series to a fourth capacitance formed with the conductor 242 and the first conductor 122. The second inductance element and the fourth capacitance are connected in parallel to the first capacitance formed with the second conductor 240 and the first conductor 122.

According to this modified example, since the inductance element and the capacitance of the unit cell 50 are increased, the adjustment range of the characteristics of the metamaterial is broadened.

Figure 25:
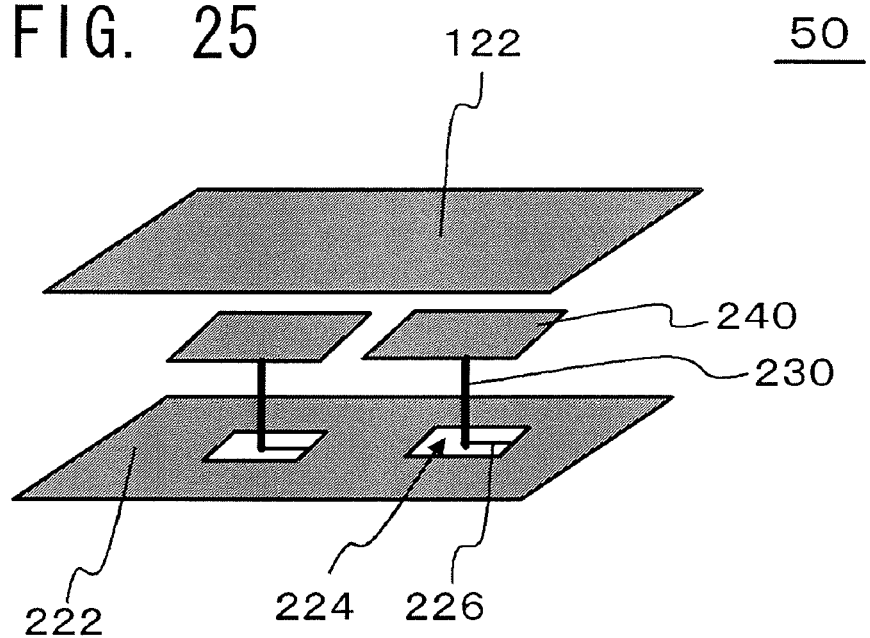
FIG. 25 is a perspective view illustrating a unit cell of a second modified example of the fifth and sixth embodiments.

FIG. 25 is a perspective view illustrating a unit cell 50 of a second modified example. The unit cell 50 of this modified example has the same configuration as the unit cell 50 of the fifth and sixth embodiments except that a plurality of opening parts 224 and a plurality of interconnects 226 are formed in a third conductor 222. Each opening part 224 is formed at a position facing a second conductor 240 in the third conductor 222. An end of the connection portion 230 is located inside the opening part 224. The interconnect 226 interconnects the connection portion 230 with the third conductor 222.

The equivalent circuit of the unit cell 50 shown in FIG. 25 is substantially the same as that of the unit cell 50 shown in FIG. 20. Specifically, the interconnect 226 functions with the connection portion 230 as an inductance element of the unit cell 50. That is, in this modified example, the inductance element of the unit cell 50 can be increased by providing the opening parts 224 and the interconnects 226.

Figure 26:
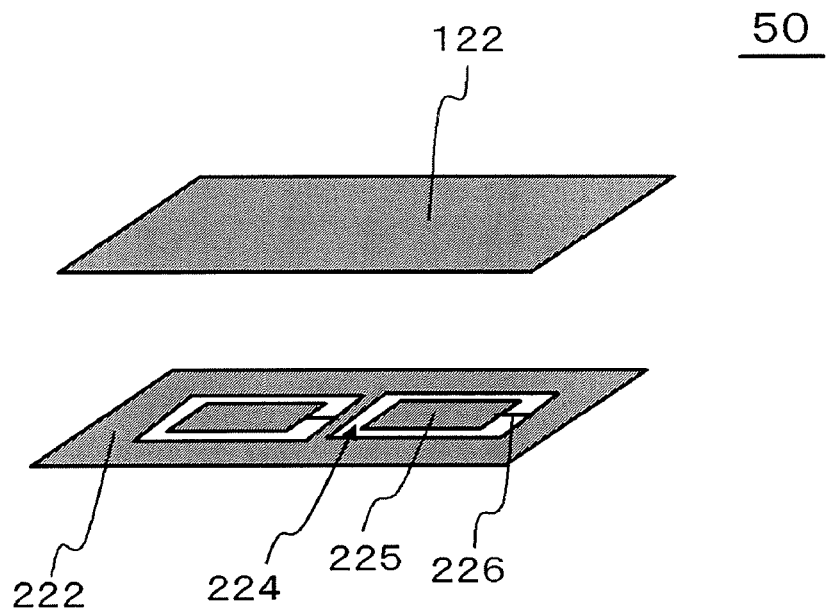
FIG. 26 is a perspective view illustrating a unit cell of a third modified example of the fifth and sixth embodiments.

FIG. 26 is a perspective view illustrating a unit cell 50 of a third modified example. The unit cell 50 of this modified example has the same configuration as the unit cell 50 shown in FIG. 25 except that second conductors 225 are provided instead of the second conductors 240. The second conductor 225 is formed in an island shape inside an opening part 224, and is interconnected to the third conductor 222 by the interconnect 226.

The equivalent circuit of the unit cell 50 shown in FIG. 26 is substantially the same as that of the unit cell 50 shown in FIG. 20. Specifically, the interconnect 226 functions as an inductance element of the unit cell 50 instead of the connection portion 230. Instead of the second conductor 240, the second conductor 225 forms a first capacitance with the first conductor 122. The first conductor 122 and the third conductor 222 function as a second capacitance of the unit cell 50. A third capacitance is formed between the adjacent second conductors 240.

In this modified example, the same advantages as those of the fifth and sixth embodiments can be obtained. Further, since the unit cell 50 can be configured with two layers, the radio communication apparatus can be made thinner.

Figure 27:
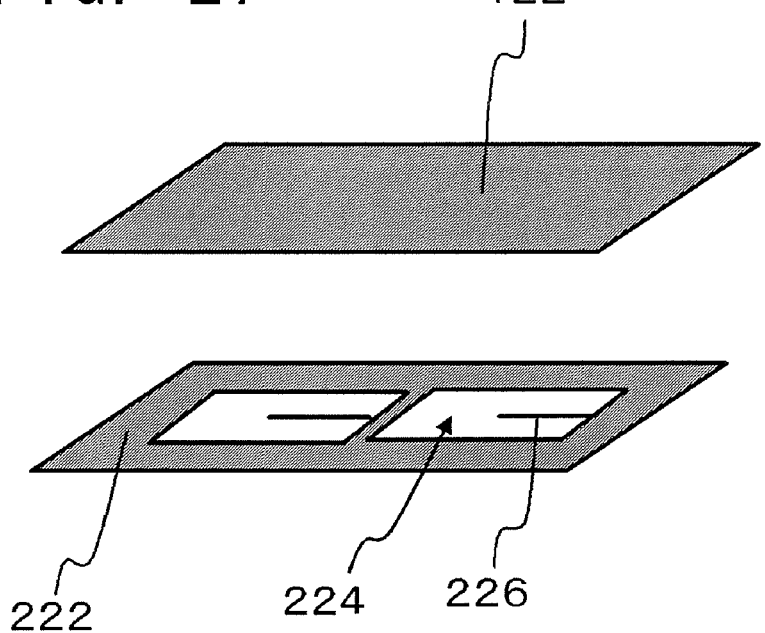
FIG. 27 is a perspective view illustrating a unit cell of a fourth modified example of the fifth and sixth embodiments.

FIG. 27 is a perspective view illustrating a unit cell 50 of a fourth modified example. The unit cell 50 in this modified example has the same configuration as that shown in FIG. 26 except that the unit cell 50 in this modified example does not include the second conductor 225.

Figure 28:
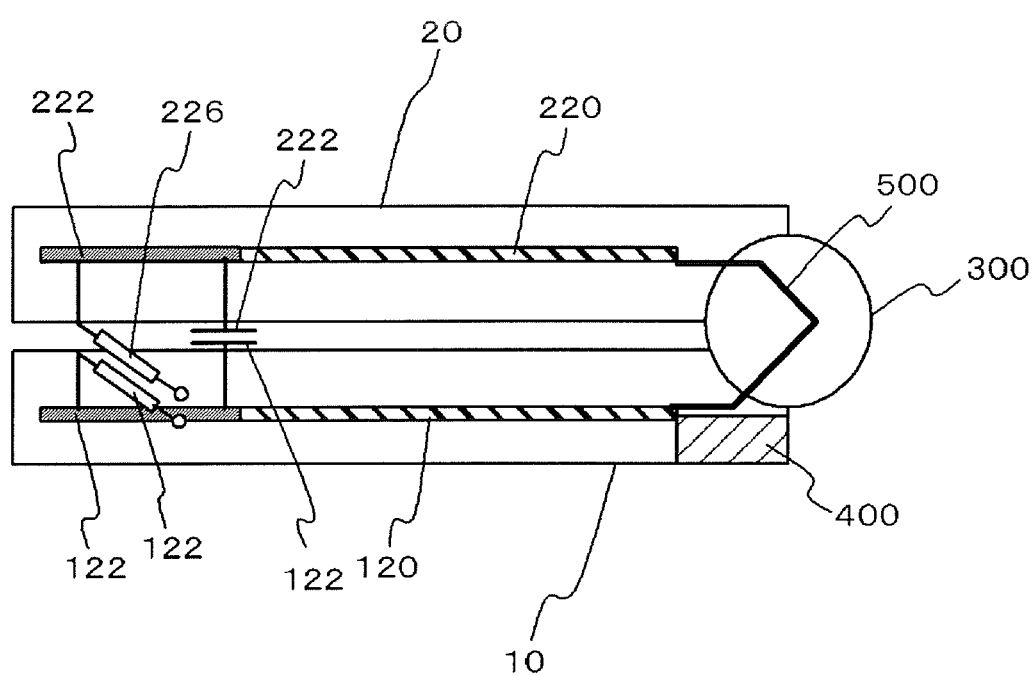
FIG. 28 is an equivalent circuit diagram illustrating a unit cell shown in FIG. 27.

FIG. 28 is an equivalent circuit diagram illustrating the unit cell 50 shown in FIG. 27. The equivalent circuit shown in FIG. 28 is the same as the equivalent circuit shown in FIG. 20 except that an open stub is provided in FIG. 28 instead of the LC serial resonance circuit in FIG. 20. Specifically, the interconnect 226 is electrically coupled with the first conductor 122 facing the interconnect 226 to form a microstrip line in which the first conductor 122 is used as a return path. One end of the microstrip line is an open end, and thus functions as an open stub. The unit cell 50 having such a configuration can be described as the equivalent circuit in which a parallel plate formed with the first conductor 122 and the third conductor 222 is shunted as an open stub in FIG. 28, and thus the first conductor 122 and the third conductor 222 are short-circuited to each other at the resonance frequency of the open stub. Since the short-circuit frequency can be controlled by the stub length of the open stub, the short-circuit frequency can easily be adjusted and the unit cell 50 can be downsized.

Figure 29:
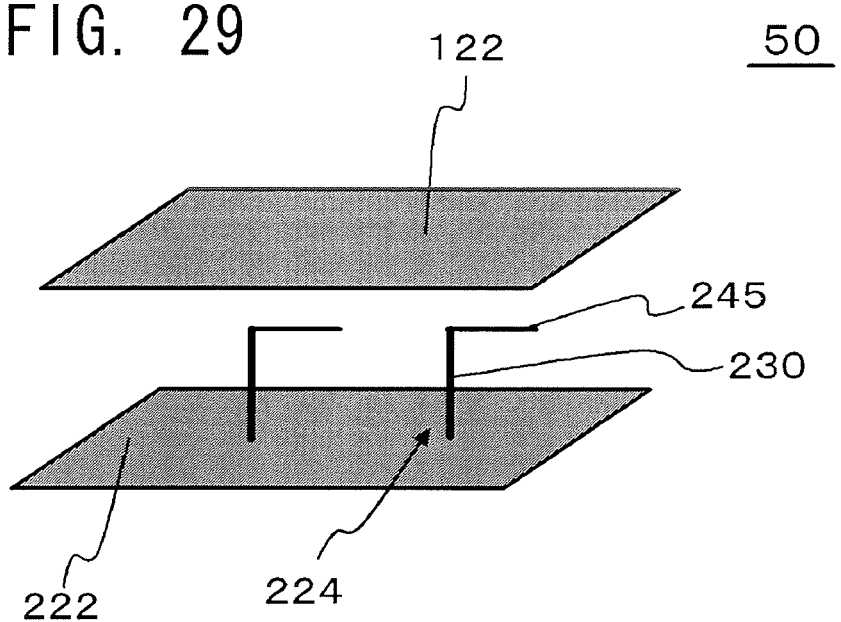
FIG. 29 is a perspective view illustrating a unit cell of a fifth modified example of the fifth and sixth embodiments.

FIG. 29 is a perspective view illustrating a unit cell 50 of a fifth modified example. The unit cell 50 of this modified example has the same configuration as the unit cell 50 of the fifth and sixth embodiments except that an interconnect 245 is provided instead of the second conductor 240. The interconnect 245 extends in parallel to the third conductor 222. One end of the interconnect 245 is connected to the connection portion 230, and the other end of the interconnect 245 is an open end.

Figure 30:
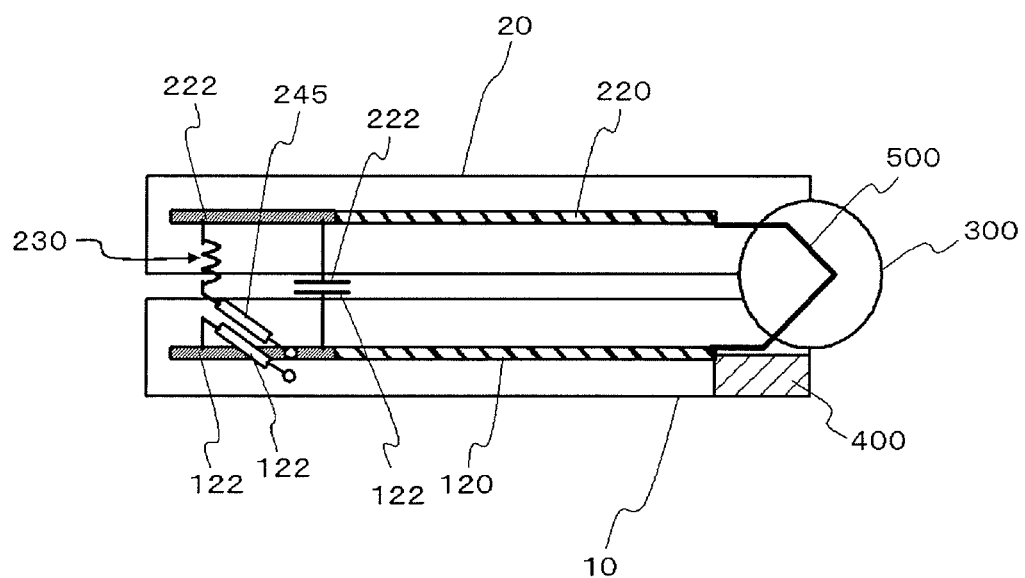
FIG. 30 is an equivalent circuit diagram illustrating a unit cell shown in FIG. 29.

FIG. 30 is an equivalent circuit diagram illustrating the unit cell 50 shown in FIG. 29. The unit cell 50 shown in FIG. 29 is the same as that shown in FIG. 20 except that an open stub is provided instead of the first capacitance formed with the second conductor 240 and the first conductor 122. The open stub is formed with the interconnect 245 and a portion of the first conductor 122 that faces the interconnect 245. By forming the open stub, a large inductance is given to the unit cell 50. Therefore, the adjustment range of the characteristics of the metamaterial is broadened.

Seventh Embodiment

Figure 31:
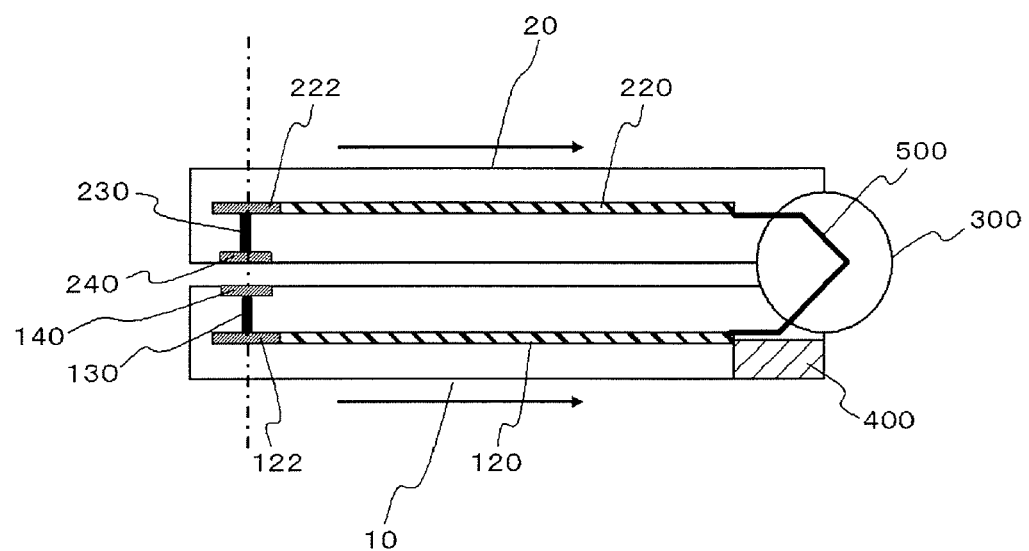
FIG. 31 is a sectional view illustrating the configuration of a radio communication apparatus of a seventh embodiment.
Figure 32:
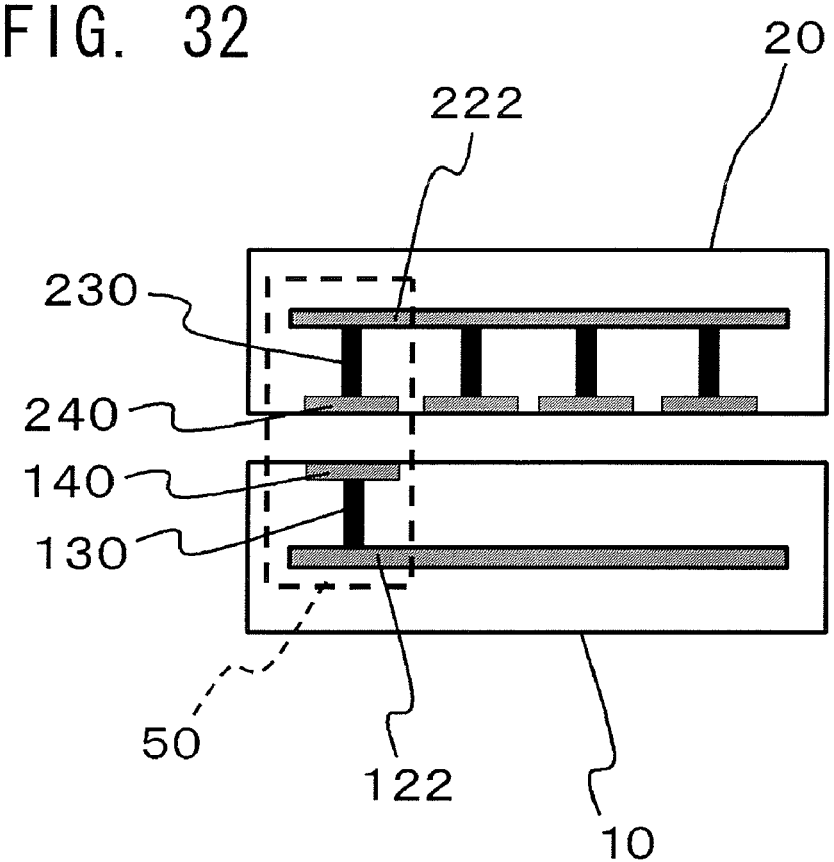
FIG. 32 is a diagram illustrating the cross-sectional surface indicated by a one-dot chain line of FIG. 31.

FIG. 31 is a sectional view illustrating the configuration of a radio communication apparatus of a seventh embodiment. FIG. 32 is a diagram illustrating the cross-sectional surface indicated by a one-dot chain line of FIG. 31. The radio communication apparatus of this embodiment has the same configuration as the radio communication apparatus of the fifth embodiment except that a first casing 10 includes a plurality of fourth conductors 140 and a plurality of connection portions 130.

When the first casing 10 faces a second casing 20, the fourth conductors 140 are located to be closer to the second casing 20 than the first conductor 122 is, and are arranged in a repetitive manner at positions facing the second conductors 240. The connection portion 130 is, for example, a via and connects the fourth conductor 140 to the first conductor 122.

With such a configuration, the first conductor 122, the connection portions 130, and the plurality of fourth conductors 140 form a first metamaterial, and the plurality of second conductors 240, the connection portions 230, and the third conductor 222 form a second metamaterial. In the first and second metamaterials, the band-gap frequency band does not include the communication frequency of the radio communication apparatus. Therefore, since the first circuit substrate 120 and the second circuit substrate 220 are electrically connected to each other through the first and second metamaterials at the communication frequency of the radio communication apparatus, the first circuit substrate 120 and the second circuit substrate 220 can be regarded as one sheet of conductor. Accordingly, in this embodiment, the same advantages as those of the fifth embodiment can be obtained.

Consequently, according to the radio communication apparatus 100 of each embodiment of the present invention, the influence of the conductor layer 34 of the interconnect substrate 30 on the antenna characteristics of the antenna device 40 can be reduced. The embodiments are merely examples of the present invention and various configurations other than the above-described configurations may be used.

Priority is claimed on Japanese Patent Application No. 2010-081440, filed on Mar. 31, 2010 and Japanese Patent Application No. 2010-081473, filed on Mar. 31, 2010, the content of which is incorporated herein by reference.

The invention claimed is:
1. A radio communication apparatus comprising:
a first casing mechanically connected to a second casing in a slidable manner so that the casings may be moved between open and closed positions;
a connection section electrically connecting electronic components of the first casing to electronic components of the second casing;
an antenna device that operates at a predetermined communication frequency located in at least one of the casings;
the connection section having first and second conductors which are spaced apart and face one another when the casings are in the open position so as to form a metamaterial that resonates at the predetermined communication frequency and thus the first and second conductors are electrically connected to each other at the predetermined communication frequency, wherein the connection section is a flexible interconnect substrate including an interconnect layer, a conductor layer, and a conductor component connected to the interconnect layer;
  wherein when the casings are in the closed position, the first flexible; interconnect substrate is folded and the first conductor formed with the conductor component in one region faces the second conductor formed with a conductor layer in another region, and the flexible interconnect substrate is further extended in the open position than it is in the closed position;
  wherein the flexible interconnect substrate further includes a reflection structure that reflects an electromagnetic wave of the communication frequency of the radio communication apparatus;
  wherein the reflection structure is either disposed in the same layer as a second conductor layer formed on a side of a rear surface of the conductor layer with the interconnect layer interposed therebetween or is laminated on the side of the rear surface further from the second conductor layer.

2. The radio communication apparatus according to claim 1, wherein an area of an overlapping region of the flexible interconnect substrate when the casings are in the closed position is greater than an area of the overlapping region when the casings are in the open position.

3. The radio communication apparatus according to claim 2, wherein the antenna device is located at a position that faces the overlapping region.

4. The radio communication apparatus according to claim 1, wherein: the conductor component is either disposed in the same layer as the conductor layer or is laminated on a side of a front surface of the conductor layer, and
  the flexible interconnect substrate is folded so that the side of the front surface is folded inward when the casings are in the closed position.

5. The radio communication apparatus according to claim 1, wherein the flexible interconnect substrate is formed in a substantial Ω shape when the casings are in the closed position and a single or plurality of the conductor components are provided in a neck portion of the substantial Ω shape.

6. The radio communication apparatus according to claim 1, wherein the reflection structure faces the antenna device when the casings are in at least one of the open and closed positions.

7. The radio communication apparatus according to claim 1, wherein: the conductor components are formed locally in the conductor layer, and a greater number of the reflection structures than the conductor components are installed in the second conductor layer.

8. The radio communication apparatus according to claim 1, wherein the conductor component forms a right-handed metamaterial in the first state and the reflection structure forms a left-handed metamaterial.

9. The radio communication apparatus according to claim 1, wherein:
  one end of the first casing is mounted on one end of the second casing to be rotatable by the connection section so that the first and second casings overlap with each other, and
  the first casing, the second casing, or the connection section has the antenna device therein,
  the first casing has the first conductor therein, and
  the second casing has the second conductor therein, and the second conductor is disposed at a position facing the first conductor when the first and second casings overlap with each other.

10. The radio communication apparatus according to claim 9 further comprising a plurality of the second conductors.

11. The radio communication apparatus according to claim 10, wherein the plurality of second conductors are arranged at an interval equal to or less than half of a wavelength of the communication frequency of the radio communication apparatus.

12. The radio communication apparatus according to claim 9, further comprising: a third conductor disposed inside the second casing and at a position facing the second conductor; and a connection portion connecting each of the second conductors to the third conductor,
  wherein the second conductor is located to be closer to the first casing than the third conductor is, when the first and second casings overlap with each other.

13. The radio communication apparatus according to claim 9, further comprising: a third conductor disposed inside the second casing and at a position facing the second conductor; and a fourth conductor disposed inside first casing and at a position facing the first conductor,
  wherein the fourth conductor is located to be closer to the second casing than the first conductor is and the second conductor is located to be closer to the first casing than the third conductor is, when the first and second casings overlap with each other.

14. The radio communication apparatus according to claim 13, wherein:
  the first and second conductors form a first metamaterial,
  the second and fourth conductors form a second metamaterial, and
  the first and second casings are electrically connected to each other at the communication frequency of the radio communication apparatus by the first and second metamaterials.

15. The radio communication apparatus according to claim 9, wherein: the first casing includes a first metal structure formed with plate-shaped metal, and wherein the first conductor is formed as a part of the first metal structure.

16. The radio communication apparatus according to claim 9, wherein the second casing includes a second metal structure formed with plate-shaped metal, and the second conductor is formed as a part of the second metal structure.

17. The radio communication apparatus according to claim 9, wherein the antenna device is mounted inside the connection section or on one end of the first or second casing, the first conductor is located at the other end of the first casing, and the second conductor is located at the other end of the second casing.

18. The radio communication apparatus according to claim 9, wherein the first and second conductors face each other with no conductor interposed therebetween, when the first and second casings overlap with each other.

19. A method of reducing current flow in an overlapping region in a radio communication apparatus including a first casing mechanically connected to a second casing in a slidable manner so that the casings may be moved between open and closed positions, a connection section electrically connecting electronic components of the first casing to electronic components of the second casing and an antenna device that operates at a predetermined communication frequency located in at least one of the casings, the method comprising:
  providing the connection section with first and second conductors which are spaced apart and face one another when the casings are in the open position so as to form a metamaterial that resonates at the predetermined communication frequency and thus the first and second conductors are electrically connected to each other at the predetermined communication frequency, wherein the connection section is a flexible interconnect substrate including an interconnect layer, a conductor layer, and a conductor component connected to the conductor layer when the casings are in the closed position, the conductor component is made resonate at the communication frequency, when a second conductor formed with the conductor layer on one side of the flexible interconnect substrate in the overlapping region faces the first conductor formed with the conductor component of the other side of the flexible interconnect substrate in the overlapping region, wherein a part of the overlapping region and a different part of the overlapping region are short-circuited to each other by making the conductor component resonate at the communication frequency of the radio communication apparatus, when the conductor component disposed in the same layer as the conductor layer or laminated on the inner side of the folded interconnect substrate with respect to the conductor layer faces the conductor layer in the different part of the overlapping region.

* * * * *